US006900841B1

(12) United States Patent
Mihara

(10) Patent No.: US 6,900,841 B1
(45) Date of Patent: May 31, 2005

(54) IMAGE PROCESSING SYSTEM CAPABLE OF APPLYING GOOD TEXTURE SUCH AS BLUR

(75) Inventor: Takashi Mihara, Iruma (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/476,910

(22) Filed: Jan. 3, 2000

(30) Foreign Application Priority Data

Jan. 11, 1999 (JP) ............................................ 11-004216

(51) Int. Cl.[7] ........................ H04N 5/232; H04N 5/225
(52) U.S. Cl. ..................... 348/345; 348/335; 348/222.1
(58) Field of Search .............................. 348/222.1, 239, 348/335, 342, 345, 348; 382/264, 255, 106; 359/698

(56) References Cited

U.S. PATENT DOCUMENTS

| 4,244,707 A | * | 1/1981 | Wason .......................... 51/308 |
| 5,193,124 A | * | 3/1993 | Subbarao .................... 382/255 |
| 5,438,366 A | * | 8/1995 | Jackson et al. ............. 348/342 |
| 5,511,155 A | * | 4/1996 | Yamaguchi ................. 345/643 |
| 5,754,899 A | * | 5/1998 | Taniguchi et al. .......... 396/243 |
| 5,864,430 A | * | 1/1999 | Dickey et al. .............. 359/559 |
| 6,252,997 B1 | * | 6/2001 | Miura et al. ................ 382/261 |
| 6,295,392 B1 | * | 9/2001 | Gregory et al. ............. 382/321 |
| 6,498,624 B1 | * | 12/2002 | Ogura et al. ................ 348/335 |
| RE38,307 E | * | 11/2003 | Gustafsson et al. ......... 359/385 |

FOREIGN PATENT DOCUMENTS

| JP | 6-118473 | 4/1994 |
| JP | 7-21365 | 1/1995 |
| JP | 9-181966 | 7/1997 |
| JP | 09-181966 | * 11/1997 ........... H04N/6/253 |

OTHER PUBLICATIONS

Siam J. Optim, Reconstruction with Noisy Data: An Approach Via Eigenvalue Optimization, Society for Industrial and Applied Mathematics vol. 8, No. 1 p. 82–104, Feb. 1998.*

Kaneko et al; "Modeling of Blurring in Human Eyes and Binocular Stereoscopic Display by Modeling", 1990; 40th Conference of Information Processing Society of Japan, pp. 109–110.

* cited by examiner

Primary Examiner—Wendy R. Garber
Assistant Examiner—Kelly L. Jerabek
(74) Attorney, Agent, or Firm—Frishauf, Holtz, Goodman & Chick, P.C.

(57) ABSTRACT

An image processing apparatus assumes the characteristic of a virtual image sensing optical system, and applies a blur effect corresponding to an in-focus state to a captured image. An image input unit captures image information including distance information to each portion of an object to be photographed. A parameter input unit inputs a parameter from which the effective aperture and focal length of the assumed image sensing optical system can be derived. An in-focal pint position designation unit designates the in-focal pint position of the assumed image sensing optical system. A blur state calculation unit calculates a blur state from the distance information input by the image input unit, the in-focal pint position designated by the in-focal pint position designation unit, and the parameter input by the parameter input unit. An image processing unit applies the blur effect to the image input by the image input unit in correspondence with the blur state calculated by the blur state calculation unit.

22 Claims, 12 Drawing Sheets

| Z(m) | d/D(Zf=0.3m) | d/D(Zf=1m) | d/D(Zf=10m) |
|---|---|---|---|
| 0.1 | 0.4 | 0.47 | 0.49 |
| 0.2 | 0.1 | 0.21 | 0.24 |
| 0.4 | 0 | 0.078 | 0.12 |
| 0.6 |  | 0.035 | 0.078 |
| 1m |  |  | 0.045 |
| 1.2m |  |  | 0.037 |
| 1.5m |  |  | 0.028 |
| 2m |  |  | 0.022 |

| Z(m) | d/D(Zf=0.3m) | d/D(Zf=0.6m) | d/D(Zf=2m) |
|---|---|---|---|
| 0.2 | | | |
| 0.4 | 0.05 | | |
| 0.6 | 0.10 | | |
| 0.8 | 0.125 | 0.022 | |
| 1 | 0.140 | 0.363 | |
| 1.3 | 0.153 | 0.0489 | |
| 1.6 | 0.163 | 0.0570 | |
| 2.0 | 0.170 | 0.0630 | |
| 2.5 | 0.176 | 0.0690 | 0.0051 |
| 3 | 0.180 | 0.0727 | 0.0085 |

PROCESSING FROM OBJECT HAVING
LARGE |Z| IN UNITS OF OBJECTS

IMAGE PROCESSING SYSTEM CAPABLE OF APPLYING GOOD TEXTURE SUCH AS BLUR

BACKGROUND OF THE INVENTION

The present invention relates to an image processing system capable of applying a good texture such as a blur and, more particularly, to an image processing apparatus and method applicable to an advanced-function digital camera serving as a virtual camera, and a computer-readable program storage medium used in the apparatus and method.

With the recent spread and functional advancement of home or personal computers (PCs), personal digital cameras have been developed to take the place of conventional cameras using a silver halide film. Also, higher-grade digital cameras having a CCD of 1,000,000 pixels or more are available.

This high-resolution digital camera is optimal for entertainment purposes: an image can be displayed on a high-resolution display of VGA or higher, or printed by a large-size printer for A4 size or larger.

At the same time, an image processing technique, which has conventionally been used in only special study purposes, movie production, and printing jobs, can be realized by a low-cost home computer along with downsizing by computer techniques, reduction in power consumption, and improvement of image processability.

Computers (CPUs), which were conventionally high-cost, large-size machines, have been downsized and reduced in power consumption and can now be incorporated in digital cameras.

In the digital camera, as a high-resolution CCD of, e.g., 800,000 or 1,300,000 pixels is downsized from ½" to ¼", the lens is also downsized to increase the F-number and shorten the focal length.

Under this circumstance, even the digital camera can have a large focal depth and are can obtain with it an in-focus image from a near distance to a far distance without any high-cost, high-precision AF function.

On the other hand, with the digital camera one can only take a similar image regardless of who the photographer is.

More specifically, a camera using a silver halide film, such as a relatively expensive single-lens reflex camera, can make an object of interest appear to float from the background or blur the periphery by arbitrarily selecting the F-number and shutter speed. Such enjoyment unique to photographing is impossible in a small-size digital camera.

However, these problems can be solved by an image processing technique.

For example, "Modeling of Blurring in Human Eyes and Binocular Stereoscopic Display by Modeling" (Kaneko et al.), 1990 (the 40th) Conference of Information Processing Society of Japan, pp. 109–110 discloses the following study. Based on depth information of a computer image, the visual blur function at the retinal position where the image is formed on the eye is approximated to a Gaussian distribution to blur the computer image.

In the field of computer image processing, filtering is often adopted in which the background is blurred using a high-pass filter, and the object image is sharpened using a low-pass filter.

Filtering using a high-pass filter is averaging as one means of image processes in which color information of pixels around a pixel of interest are averaged and replaced with the pixel of interest.

Filtering using a low-pass filter is contrast emphasis.

Further, Jpn. Pat. Appln. KOKAI Publication No. 6-118473 discloses a function of calculating inside a camera so as to apply the blur even by a small-size camera and outputting a warning, or a function of adjusting the object distance of the camera so as to apply a blur.

According to Jpn. Pat. Appln. KOKAI Publication No. 7-21365, image data, depth data, and condition information of a camera actually used to photograph an object such as the F-number and focal length are input. At the same time, a virtual image sensing parameter set by a user is separately set. A blur parameter is calculated from the input values. The calculated blur parameter is compared with the actual blur corresponding to the set value of the camera information such as the F-number and focal length to selectively use a low-pass filter and high-pass filter. Then, a new image is output to an image memory upon image processing.

According to Jpn. Pat. Appln. KOKAI Publication No. 9-181966, an image sensed using a pair of image sensing lenses having a parallax is input, and distance information is calculated based on the information. Blur parameters including any one of the F-number, f-number, and focal point position are selected to apply a blur effect.

Any of the conventional methods applies a blur by image processing. This is basically equivalent to a conventional method of filtering a computer image having data in the direction of depth. Hence, the above-described methods cannot apply any good texture to an image having a long focal length by a future micro-digital camera.

For example, in Jpn. Pat. Appln. KOKAI Publication No. 7-21365, information about any one of the F-number, f-number, and focal point position of a camera actually used to photograph an object is supplied. The blur characteristic is calculated using the set F-number, f-number, or focal point position, and a new image is produced by image processing selectively using a low-pass filter and high-pass filter. However, the actual image is blurred, so no sharp image can be obtained from this image by a low-pass filter.

When the camera uses a zoom lens, it is difficult to always supply information about any one of the F-number, f-number, and focal point position.

Such information depends on the system or camera in use, and cannot be generalized and hardly attains compatibility.

An image is blurred selectively using a low-pass filter and high-pass filter, so no good texture can be obtained.

In Jpn. Pat. Appln. KOKAI Publication No-9-181966, an image sensed using a pair of image sensing lenses having a parallax is input, and distance information is calculated based on the information. The blur parameter is selected to apply the blur effect. This satisfies the above requirement. However, since this blur parameter includes any one of the F-number, f-number, and focal point position, camera information is also necessary. The camera information is not compatible and general, and the blur does not give a good texture.

The present inventors have studied in pursuit of good textures sought for current digital cameras for long and found the following functions and requirements that are necessary for next-generation digital cameras.

The camera has high resolution with a sufficient number of pixels, e.g., 800,000 pixels or more.

The camera can focus from infinity to a relatively near distance.

The camera has information in the direction of depth of an object.

Pieces of depth information are collected in units of objects in order to remove noise.

Camera information except for an image and depth information is unnecessary.

The field angle and lens information are set only in setting a virtual camera.

The texture applied by image processing includes a blur, color, and reflectivity.

The blur is determined based on the lens theory of the camera, and is natural.

The blur, color, and reflectivity can be adjusted.

Unless these problems are solved, the texture of the digital camera is practically difficult to improve.

To satisfy these conditions, realization of a digital camera capable of applying a texture is demanded.

BRIEF SUMMARY OF THE INVENTION

The present invention has been made in consideration of the above situation, and has as its object to provide an image processing apparatus capable of contributing to realization of a digital camera system capable of solving the above-described problems and practically improving the texture of a digital camera, thereby applying a texture such as a blur and, more particularly, to provide an image processing system capable of applying a good texture such as a blur, that includes an image processing apparatus and method applicable to an advanced-function digital camera serving as a virtual camera, and a computer-readable program storage medium used in the apparatus and method.

To achieve the above object, according to the present invention, there is provided an image processing apparatus for assuming a characteristic of a virtual image sensing optical system, and applying a blur effect corresponding to a preset in-focus state to a captured image, comprising:

an image input unit for capturing image information including distance information to each portion of an object to be photographed;

a parameter input unit for inputting a parameter from which an effective aperture and focal length of the assumed image sensing optical system can be derived;

an in-focal point position designation unit for designating an in-focal point position of the assumed image sensing optical system;

a blur state calculation unit for calculating a blur state from the distance information input by the image input unit, the in-focal point position designated by the in-focal point position designation unit, and the parameter input by the parameter input unit; and an image processing unit for applying the blur effect to the image input by the image input unit in correspondence with the blur state calculated by the blur state calculation unit.

According to the second aspect of the present invention, there is provided an image processing apparatus for applying a blur effect to a captured image, comprising:

an image input unit for capturing image information including distance information to each portion of an object to be photographed; and an image processing unit for applying the blur effect to the image input by the image input unit by overwrite sequentially from an image portion having far distance information.

According to the third aspect of the present invention, there is provided an image processing apparatus for applying a blur effect to a captured image, comprising:

an image input unit for capturing image information;

an image processing unit having a first operation mode of applying the blur effect to only part of the image input by the image input unit, and a second operation mode of applying the blur effect to a remaining image portion;

a switching unit capable of externally switching an operation mode of the image processing unit from the first operation mode to the second operation mode; and a display unit capable of displaying an image blurred by the image processing unit.

According to the fourth aspect of the present invention, there is provided an image processing method of assuming a characteristic of a virtual image sensing optical system, and applying a blur effect corresponding to a preset in-focus state to a captured image, comprising the steps of:

capturing image information including distance information to each portion of an object to be photographed;

inputting a parameter capable of deriving an effective aperture and focal length of the assumed image sensing optical system;

designating an in-focal point position of the assumed image sensing optical system;

calculating a blur state from the input distance information, the designated in-focal point position, and the input parameter; and applying the blur effect to the input image in correspondence with the calculated blur state.

According to the fifth aspect of the present invention, there is provided an image processing method of applying a blur effect to a captured image, comprising the steps of:

capturing image information including distance information to each portion of an object to be photographed; and applying the blur effect to the input image by overwrite sequentially from an image portion having far distance information.

According to the sixth aspect of the present invention, there is provided an article of manufacture comprising:

a computer-readable storage medium having computer-readable program code means stored to assume a characteristic of a virtual image sensing optical system and apply a blur effect corresponding to a preset in-focus state to a captured image in an image processing apparatus, the computer-readable program code means comprising:

first computer-readable program means for providing a computer with a function of capturing image information including distance information to each portion of an object to be photographed;

second computer-readable program means for providing the computer with a function of inputting a parameter from which an effective aperture and focal length of the assumed image sensing optical system can be derived;

third computer-readable program means for providing the computer with a function of designating an in-focal point position of the assumed image sensing optical system;

fourth computer-readable program means for providing the computer with a function of calculating a blur state from the input distance information, the designated in-focal point position, and the input parameter; and fifth computer-readable program means for providing the computer with a function of applying the blur effect to the input image in correspondence with the calculated blur state.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention, and together with the general description given above and the detailed description of the preferred embodiments given below, serve to explain the principles of the invention.

DETAILED DESCRIPTION OF THE INVENTION

Figure 1:
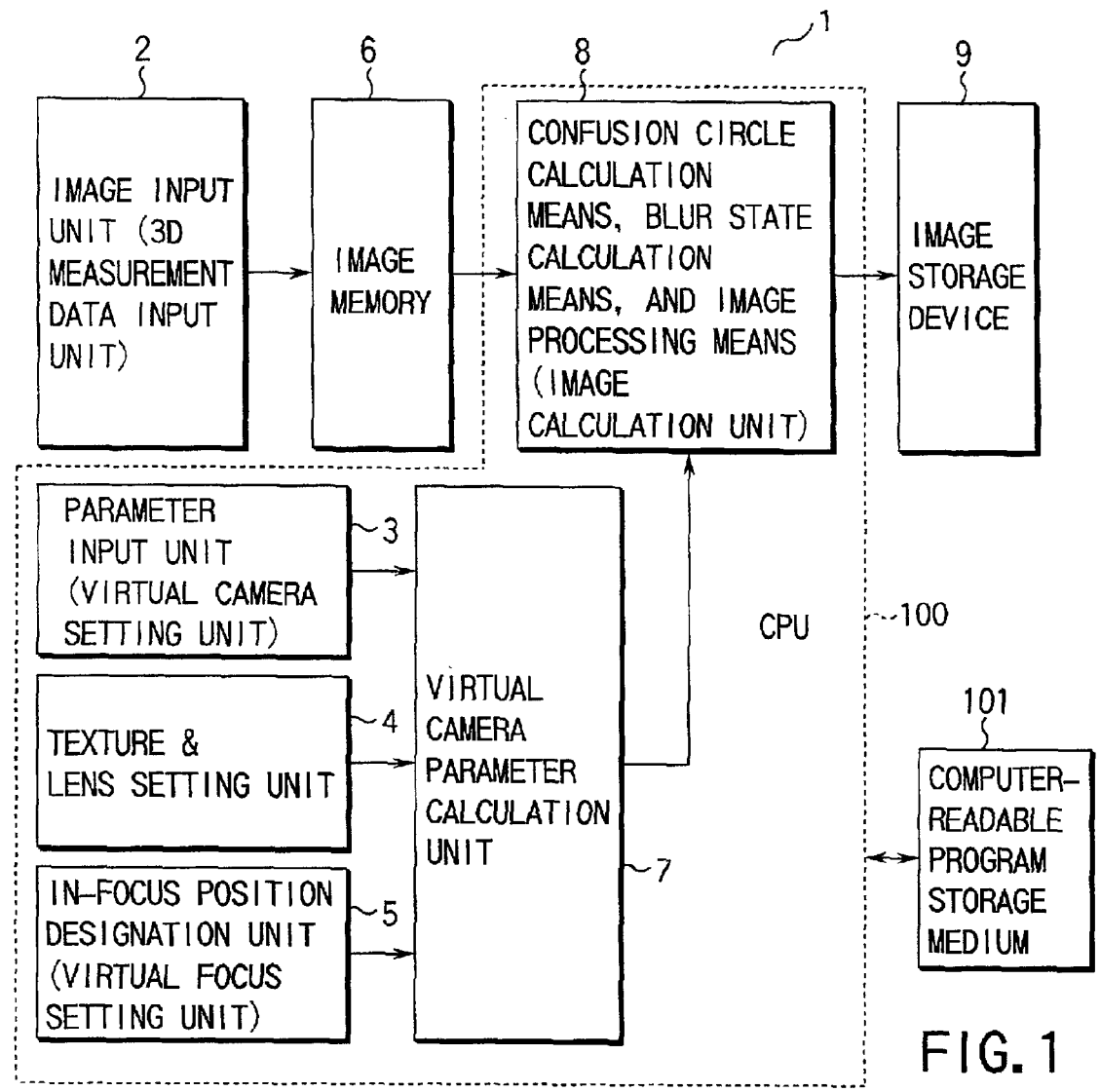
FIG. 1 is a functional block diagram showing the arrangement of the basic technique of the present invention.

Reference will now be made in detail to the presently preferred embodiments of the invention as illustrated in the accompanying drawings, in which like reference numerals designate like or corresponding parts.

Embodiments of the present invention will be described in detail below with reference to the several views of the accompanying drawing.

First Embodiment

The first embodiment of the present invention is shown in FIGS. 1 to 5.

The principle of the present invention will be explained by exemplifying the first embodiment.

FIG. 1 shows an arrangement as the functional block of a CPU 100 in order to explain the arrangement of the basic technique of the present invention.

This function may be implemented by either software or hardware.

In the software arrangement, respective functional blocks are stored in a computer-readable program storage medium 101 in units of subroutines or object instructions.

An input/output processing unit 1 in FIG. 1 comprises, as an input unit, processing unit, and output unit for image data and parameters, a three-dimensional (3D) measurement data input unit 2, virtual camera setting unit 3, texture & lens setting unit 4, virtual focus setting unit 5, image memory 6, virtual camera parameter calculation unit 7, image calculation unit 8, image (recording) storage device 9, and the like.

The 3D measurement data input unit 2 means an image input unit 2 for unique physical property data having depth information in units of two-dimensional color tone data of an image. The virtual camera setting unit 3 means a parameter input unit 3, and the virtual focus setting unit 5 means an in-focal point position designation unit 5.

The input/output processing unit 1 has a means and function of receiving setting values from the parameter input unit 3, texture & lens setting unit 4, and in-focal point position designation unit 5 on the basis of physical property data from the image input unit 2.

The image input unit 2 may be implemented by mounting an actual measurement camera, or by analog video information, compressed data, or proper interface means.

The parameter input unit 3, texture & lens setting unit 4, and in-focal point position designation unit 5 may be a keyboard or mouse, and preferably have a user-friendly structure using image icons.

The image memory 6 temporarily stores input image data from the image input unit 2.

Although not shown, an interface circuit may be arranged on the input stage of the image memory 6 to decompress compressed image data, convert data, and the like.

The virtual camera parameter calculation unit 7 converts virtual camera parameters from the parameter input unit 3, texture & lens setting unit 4, in-focal point position designation unit 5, and the like.

The image calculation unit 8 comprises a confusion circle calculation means, blur state calculation means, and image processing means. The image calculation unit 8 executes predetermined calculation such as confusion circle calculation, blur state calculation, and image processing (to be described later) using input data from the image memory 6 and a virtual camera parameter from the virtual camera parameter calculation unit 7.

A method and algorithm for realizing the means and functions of the virtual camera parameter calculation unit 7 and image calculation unit 8 are the most important in the present invention.

Note that the image memory 6 may be omitted. The image (recording) storage device 9 stores the calculation results of the image calculation unit 8.

A definitely different appendix of this arrangement from the prior art will be explained.

Jpn. Pat. Appln. KOKAI Publication No. 7-21365 discloses "a method of inputting, from a camera, image data, depth data, and camera information such as the F-number and focal length, separately setting a virtual image sensing parameter, calculating a blur parameter from the input values, comparing a calculated blur parameter with actual blur corresponding to the set value with the camera information such as the F-number and focal length, selectively using a low-pass filter and high-pass filter, and outputting a new image to an image memory upon image processing".

That is, current camera conditions and virtual camera conditions to which an image including a blur state is input are compared with each other to newly produce an image.

Jpn. Pat. Appln. KOKAI Publication No. 9-181966 discloses "a method of inputting an image sensed using a pair of image sensing lenses having a parallax, calculating distance information based on the information, and selecting a blur parameter including any one of the F-number, f-number, and focal point position, thereby applying a blur effect".

In this method, new photographing conditions are applied to current photographing conditions including camera setting conditions, and image processing is performed to apply a blur.

Compared to these prior arts, the present invention realizes the following arrangements and effects.

Video information is only image data including an image that is photographed by a three-dimensional measurement camera.

The system of the present invention adjusts virtual camera settings such as the F-number, focal length, stop value, and the like.

The performance of a lens which characterizes a blur state, the color dispersion characteristic of the lens, the dispersion characteristic of air at that time, the blur state function based on distance, and the like can be appropriately set.

The user can enjoy a virtual camera while focusing on a target object.

The basic concept of the present invention will be explained with reference to FIGS. 2 to 6B.

According to this concept, the blur radius (confusion circle) when the focus is adjusted to a given position is estimated as a rough value to obtain characteristics in this conditions.

Figure 2:
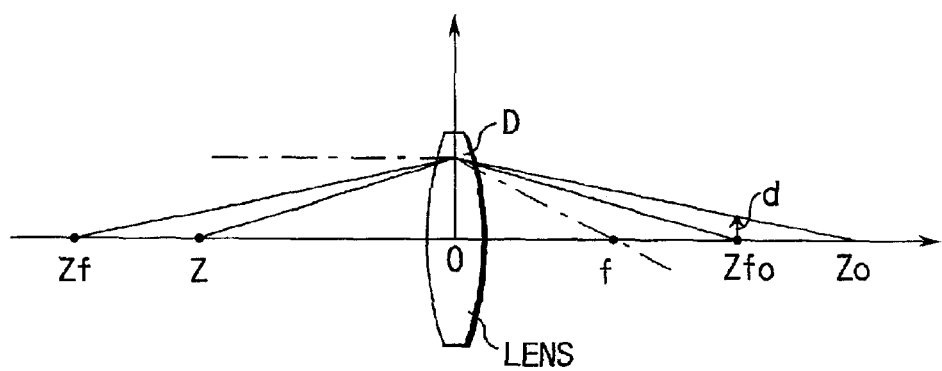
FIG. 2 is a view showing the imaging state of an object before the focal point position of a lens.

FIG. 2 shows the imaging state of an object in front of the focal point position of the lens.

Let f be the focal length of the lens, Zf be the position of an object to which the focus is adjusted, Zf be the focal point position, Z be the distance to an observation place, Zo be the distance on the imaging side to the observation place, and D be the effective aperture of the lens. The origin is the center of the lens.

When a combination of lenses are used, they are assumed to be a single lens.

Letting the imaging plane be on the positive side of the lens, and d be the blur radius at the visual point Zf when the focus is adjusted to Z, the blur radius d is calculated using geometrical relations:

$$d/(Zo-Zfo)=D/Zo \qquad (1)$$

$$(1/Z)+(1/f)=1/Zo \qquad (2)$$

$$(1/Zf)+(1/f)=1/Zfo \qquad (3)$$

thereby obtaining $$d=D\{(1/Zf)-(1/Z)\}/\{(1/Zf)+(1/f)\} \qquad (4)$$

For descriptive convenience, the absolute values of Zf and Z are used to obtain $$d=D\{(1/|Z|)-(1/|Zf|)\}/\{(1/f)+(1/|Zf|)\} \qquad (5)$$

Figures 3A, 3B:
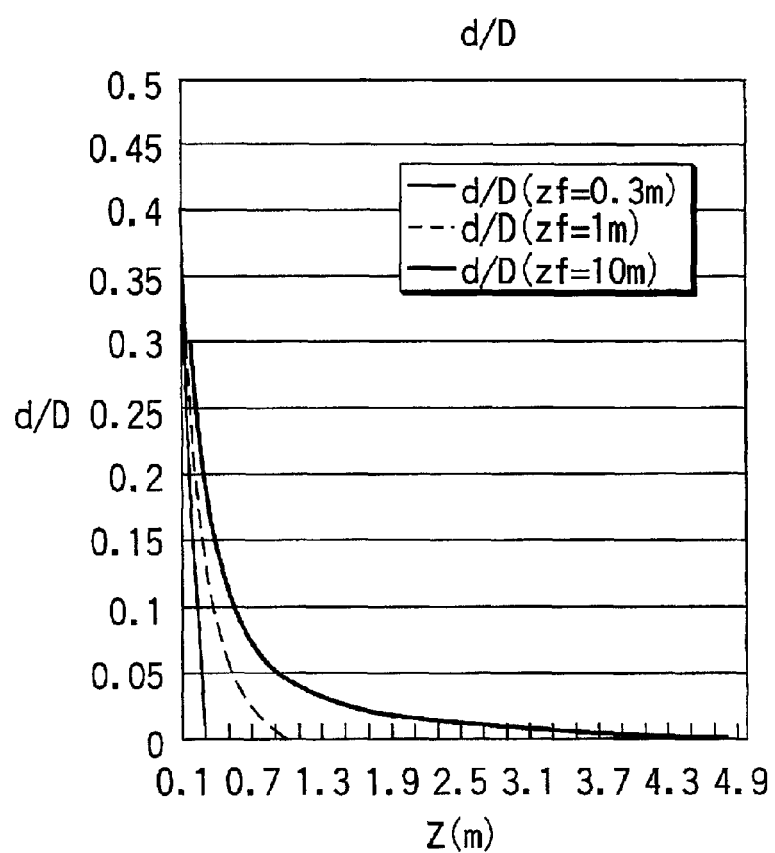
FIG. 3A is a table showing numerical values obtained by actually calculating equation (5)
FIG. 3B is a graph showing the calculation result of equation (5)

FIG. 3A shows numerical values obtained by actual calculation.

In FIG. 3A, d/D calculated at three focal point positions Zf=0.3 m, 1 m, and 10 m of a lens having f=50 mm are listed in the table.

FIG. 3B is a graph showing the calculation results.

In FIG. 3B, as the lens comes near to 20 cm or less, the confusion circle becomes larger. When the focus is set to a sufficiently far distance, d/D asymptotically decreases.

A position farther from the focus is considered.

Figure 5:
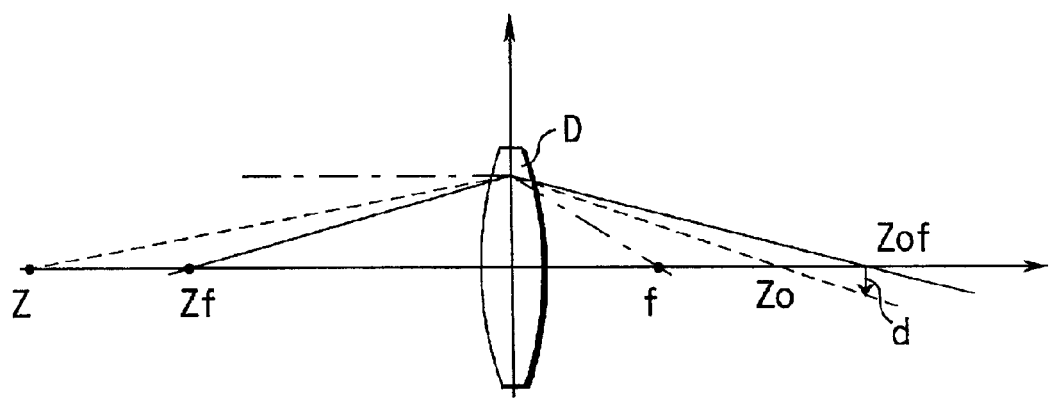
FIG. 5 is a view showing the imaging relationship of an object farther than the focal point position of the lens.

In this case, an imaging relationship as shown in FIG. 5 is obtained.

A simple geometrical equation:

$$d/(Zfo-Zo)=D/Zo \qquad (6)$$

yields $$d=D\{(1/Z)-(1/Zf)\}/\{(1/Zf)+(1/f)\} \qquad (7)$$

for Zf<0 and Z<0

For descriptive convenience, the absolute values of Zf and Z are used to obtain $$d=D\{(1/|Zf|)-(1/|Z|)\}/\{(1/f)+(1/|Zf|)\} \quad (8)$$

Figures 4A, 4B:
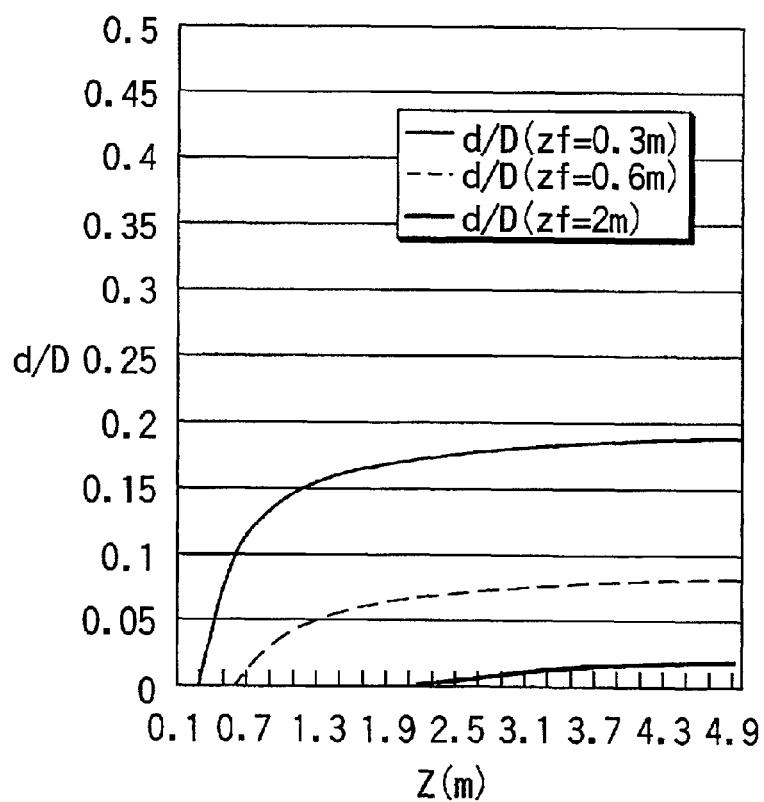
FIG. 4A is a table showing numerical values obtained by actually calculating equation (8)
FIG. 4B is a graph showing the calculation result of equation (8)

FIG. 4A shows numerical values obtained by actual calculation.

In FIG. 4A, d/D calculated at three focal point positions Zf=0.3 m, 0.6 m, and 2 m of a lens having f=50 mm are listed in the table.

FIG. 4B is a graph showing the calculation results.

For Zf=0.3 m, as the lens moves away slightly, blur abruptly increases. When the focus is adjusted to a far distance of 2 m, blur does not increase.

For example, for Zf=0.3 m, the radius d of the confusion circle reaches 10% of D at a double distance of 0.6 m, and then asymptotically increases to 20%.

For Zf=0.6 m, d reaches only 5% of D at a double distance of 1.2 m, and asymptotically increases to 10%.

The actual blur appears as a combination of the states in FIGS. 3A, 3B, 4A, and 4B.

Figure 6:
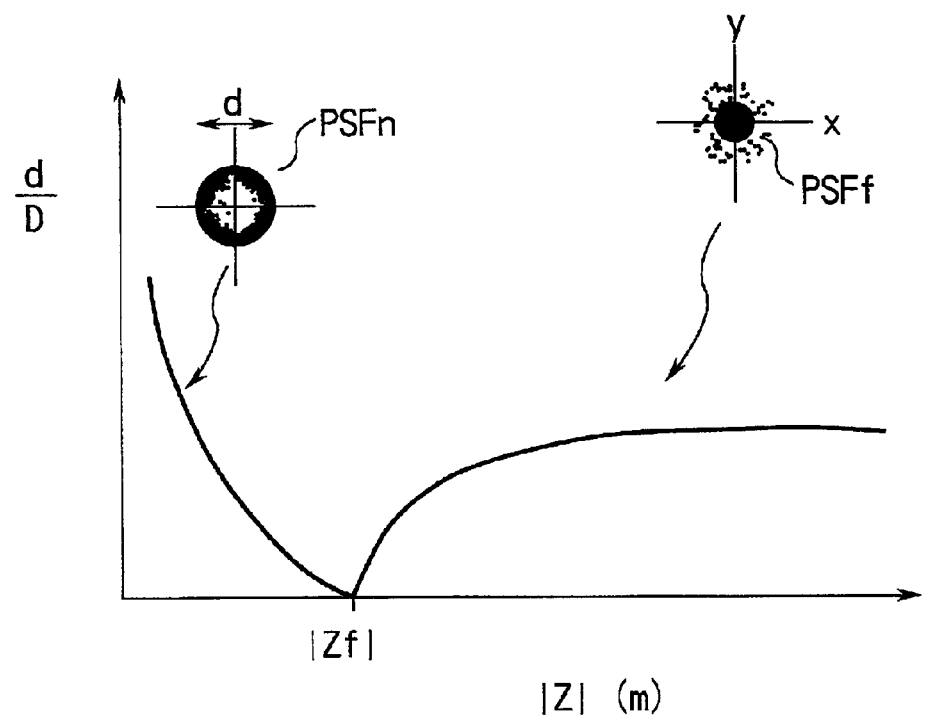
FIG. 6 is a graph showing an actual blur appearing as a combination of the states in FIGS. 3A, 3B, 4A, and 4B.

FIG. 6 shows this state.

Letting Zf be the distance to an object to focus on the focus, the radius d, which abruptly increases at a near distance, abruptly decreases to Zf, and minimizes at Zf. When the radius d exceeds Zf, it abruptly increases again to double the distance Zf, and then gradually increases.

The value d can be calculated by this quantitative analytic function.

In this manner, the size of the confusion circle d of blur can be virtually set.

More specifically, the size of the confusion circle d can be determined by the F-number and distance for adjusting a set focus using the focal length f of the lens, the effective aperture 2D, or equation (9):

$$2D=f/F \quad (9)$$

These parameters do not include any camera information in the direction of depth of an image.

This is clearly different from Jpn. Pat. Appln. KOKAI Publication No. 7-21365.

That is, in the camera in Jpn. Pat. Appln. KOKAI Publication No. 7-21365, an image and depth information are received, and camera conditions are set only within an image processing apparatus.

The present invention considers the size of the confusion circle d of blur. To actually express a natural blur or perspective, it is important to determine the shape of PSF (Point Spread Function) representing a blur.

FIG. 6 shows a blur characteristic PSFn on a side near the lens and a blur characteristic PSFf on a far side, which are empirically obtained for a general lens.

Figure 7A:
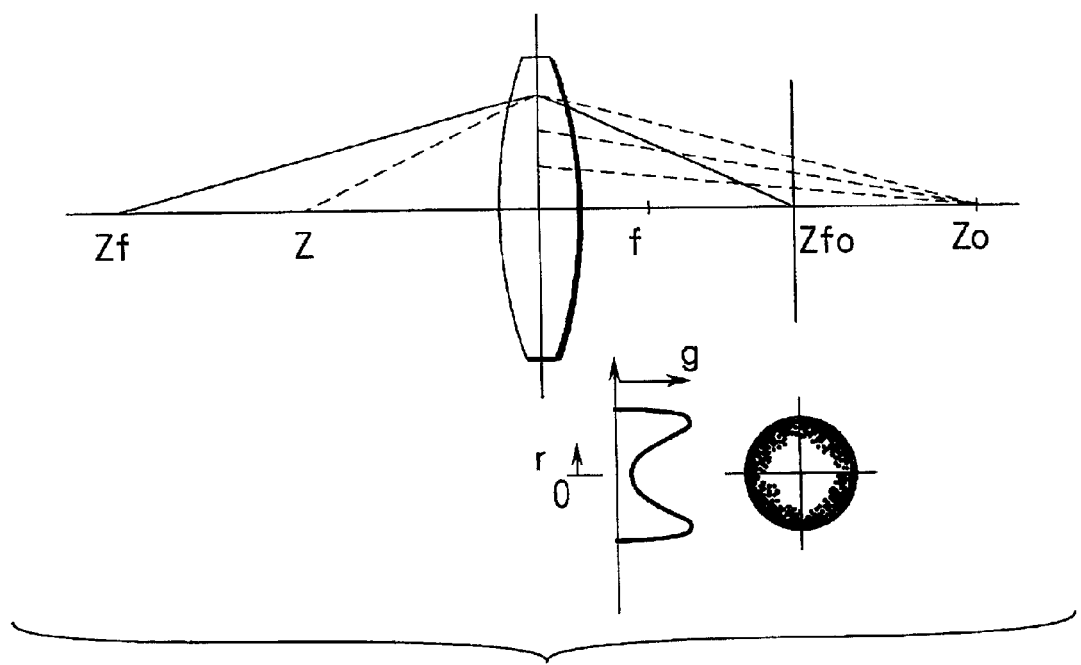
FIG. 7A is a view for explaining a PSF characteristic on a Zfo plane nearer than Zf.
Figure 7B:
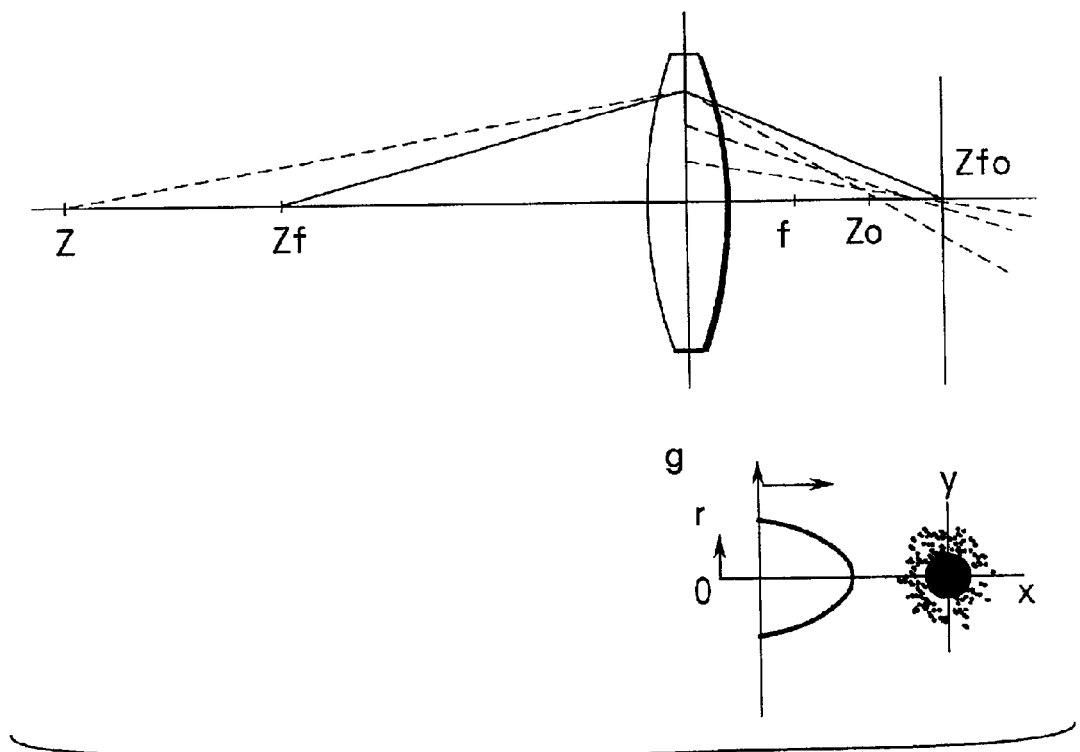
FIG. 7B is a view for explaining a PSF characteristic formed by an image farther than Zf.

FIGS. 7A and 7B are views for explaining the PSF characteristic.

FIG. 7A is a view for explaining PSF on the Zfo plane nearer than Zf. In general, the light quantity tends to be larger at the periphery.

FIG. 7B is a view for explaining PSF formed by an image farther than Zf. In general, this PSF shape greatly changes depending on the lens.

In FIGS. 7A and 7B, only astigmatism is considered. In practice, coma and chromatic aberration are present to complicate PSF.

However, presumably astigmatism free from any coma and chromatic aberration can most sensitively and naturally express a blur.

Astigmatism is radially symmetrical. Letting the convex function as shown in FIG. 7B be of A type, and the concave function as shown in FIG. 7A be of B type, these functions are power functions given by:

for A type, $$gb(r)=Gb(a_0+a_1r+a_2r^2+a_3r^3) \quad (10)$$

for B type, $$gb(r)=Gb(1-b_1r-b_2r^2-b_3r^3) \quad (11)$$

The function is normalized by G so a value outside the range $-d \leq r \leq d$ is 0 and the spatial volume is 1.

Each coefficient represents the type of function.

Figure 8:
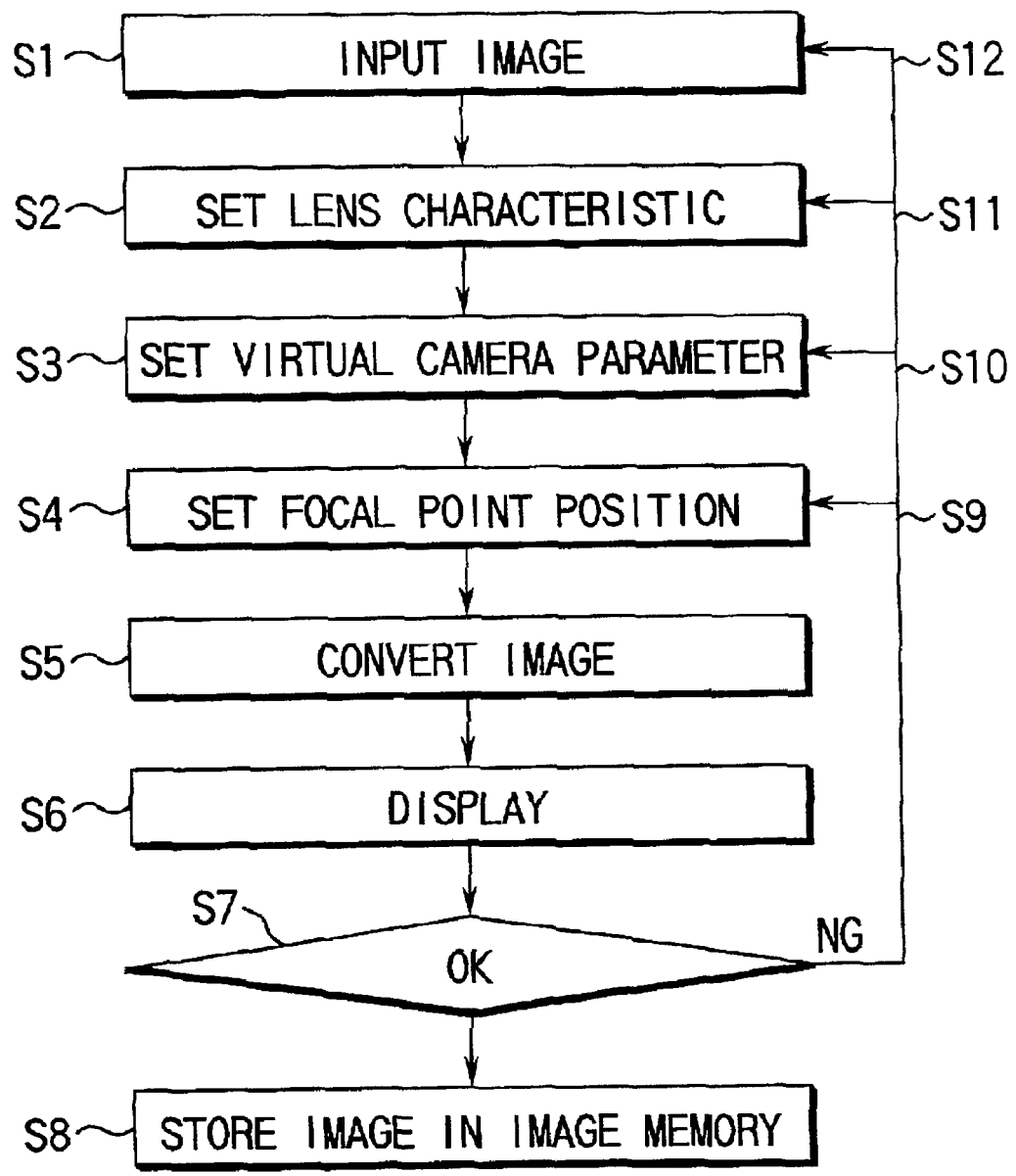
FIG. 8 is a flow chart showing the sequence of actual processing according to the first embodiment of the present invention.

FIG. 8 is a flow chart showing actual processing.

In step (S1), image data is input.

This image data may be monochrome or color. The image data has depth information desirably in units of pixels, or in units of blocks or objects.

When the image data is compressed, it is decompressed into a bitmap format, and the decompressed image is temporarily stored in the image memory 6.

In step (S2), lens characteristics are set.

Generally by setting a default value for this processing, setting by a user can be omitted.

The lens characteristics are the blur function, the type of aberration, and the like.

In step (S3), camera parameters are set.

The camera parameters are stop information and zoom information in setting the lens.

In step (S4), focus information in photographing is set.

That is, a focal length, focal point position on a window, and The like are set.

In step (S5), the blur function is calculated as follows from distance information of the image on the basis of the set values in step (S2) to step (S4), and a blur state corresponding to the distance is applied to the image data.

D is determined.

The relationship between the coordinates of the focus and an object is checked.

The size d of a confusion circle is calculated using equations (5) and (8).

The blur function is expressed using equation (10) or (11). This function may be a numerical one.

The RGB intensity of each pixel is dispersed using the blur function.

The blur state of the entire image is calculated.

In step (S6), the calculation result is displayed on a window (not shown).

In step (S7), it is determined if the image displayed on the window is OK. If OK in step (S7), the image is stored in the image storage device 9; if NG, the flow returns from step (S1) to step (S4).

By the above sequence and arrangement, the present invention can realize an image processing apparatus which can contribute to implementation of a digital camera system capable of solving the conventional problems and practically improving the texture of a digital camera, thereby applying the texture.

This sequence is merely an example, and the order may be changed.

For example, step (S4) and step (S3) may partially overlap each other so as to set camera parameters and focus information together.

Actual image conversion in step (S5) may be done in units of pixels. Alternatively, the blur function may be calculated in advance to prepare a look-up table and execute, e.g., matrix calculation.

Figure 9:
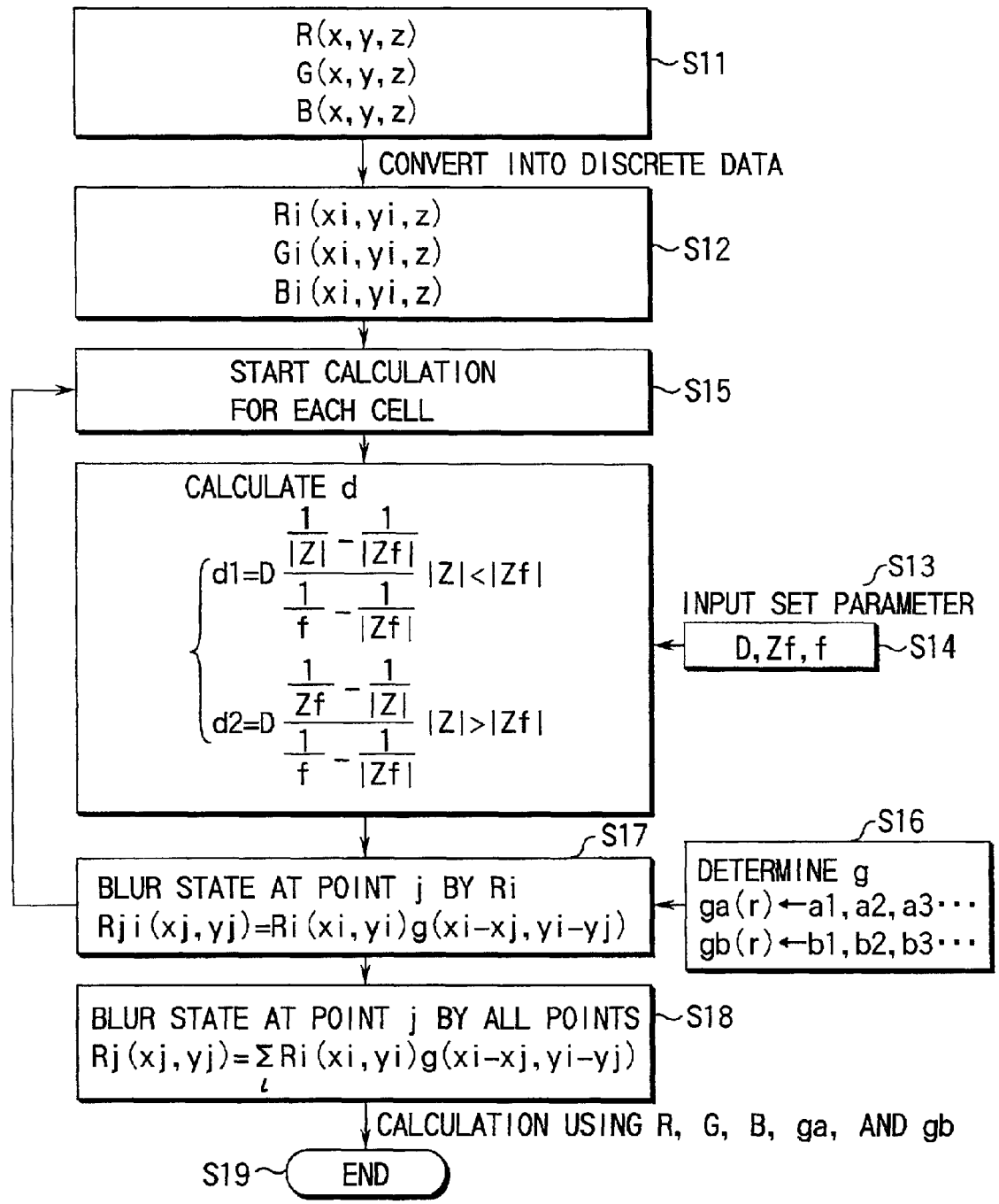
FIG. 9 is a flow chart showing a sequence when conversion processing of an actual image in step (S5) in FIG. 8 is calculated in units of pixels.

FIG. 9 shows an example of this calculation.

In step (S11), a color image of R, G, and B including depth (Z) information in units of pixels is input.

In step (S12), the color image is converted into discrete data in accordance with a device such as a memory or CCD.

In many cases, the color image has been converted into discrete data as digital information when it is input in step (S11). In this case, a field angle of interest (to be calculated) is determined, and the image is converted into discrete data within this angle.

In step (S13), setting parameters are input.

In step (S14), D, Zf, and f are extracted from the setting parameters.

In this case, f and D are calculated from lens information and the F-number using equation (9), respectively.

In step (S15), calculation starts for each pixel (i).

The start cell is selected, and d is calculated from D, Zf, and f in step (S14) and the Z value of each pixel.

In this case, two d values are calculated from the relationship of Z and Zf, and prepared as d1 and d2.

More specifically, when the absolute value of Z is smaller than Zf, d1 is used. When the absolute value of Z is larger than Zf, d2 is used.

In step (S16), a blur function obtained by lens characteristics is prepared.

The A type convex function uses ga obtained using a1 to a3 and the like, whereas the B type concave function uses gb obtained using b1 to b3 and the like.

When a function independent of distance is used, the blur function is calculated in step (S13).

When the function depends on the difference between Z and Zf, the blur function is calculated every time.

In step (S17), the blur state at a point j by Ri is calculated.

In this case, g is switched between ga and gb similar to step (S16) depending on whether the blur state is given by the A type convex function or B type concave function.

In general, when the point j is nearer the lens than Zf, the A type convex function is used. When the point j is farther, the B type concave function is used.

Since g is normalized, the sum of Ri and a value determined by the distance between the coordinates of i and j is the value j.

Only calculation for R has been described, but this also applies to G and B.

This sequence returns to step (S15) and is executed for all the pixels.

In step (S18), the blur state at the given point j influences the whole range of the blur function for the point i, and thus is given by the sum of Rji for i.

In step (S19), the flow ends.

This method can provide an image to which a natural, strong blur or the like is applied.

Strictly speaking, however, several problems remain unsolved.

Figure 10A:
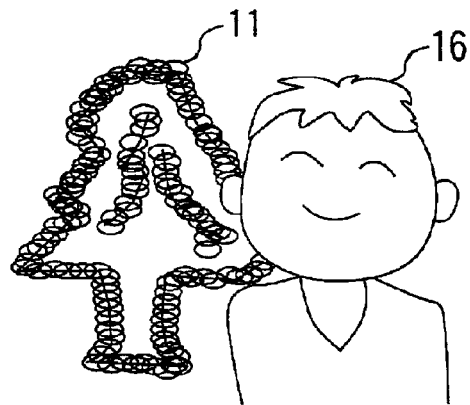
FIG. 10A is a view for explaining "occlusion" of objects caused by the processing order as one of problems which cannot be solved even by the first embodiment of the present invention.

FIG. 10A shows one of the problems, i.e., "occlusion" between objects caused by the processing order.

In FIG. 10A, the lens is focused on a near person image 16, and blur is applied to a far tree image 11. The blur of the tree image 11 occludes the person image 16.

This is "occlusion" caused since processing is done in the order from the person image 16 to the tree image 11.

Figure 10B:
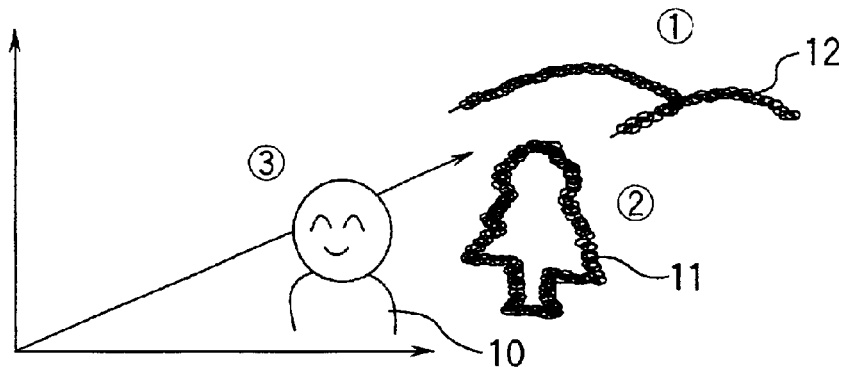
FIG. 10B is a view showing a solution to "occlusion" in FIG. 10A.

FIG. 10B shows a solution to "occlusion".

As shown in FIG. 10B, an image is first divided into objects having different depths, and information including a blur state is added for each object.

In this case, processing starts from a deeper object image 12. Then, a person image 10 is overwritten on the object image 12 to give clear depth information between the respective objects.

To add color information or overwrite a different object to give a blur and expression, the addition method must be changed.

For example, some of the following processes are required.

When the near object 10 is in focus, color information farther than the pixel is discarded and replaced with a new near object color.

When the near object 10 is not in focus, the periphery representing the blur state of the object is partially made transparent, as needed. Then, a new near object color is add to color information farther than the pixel.

Figure 10C:
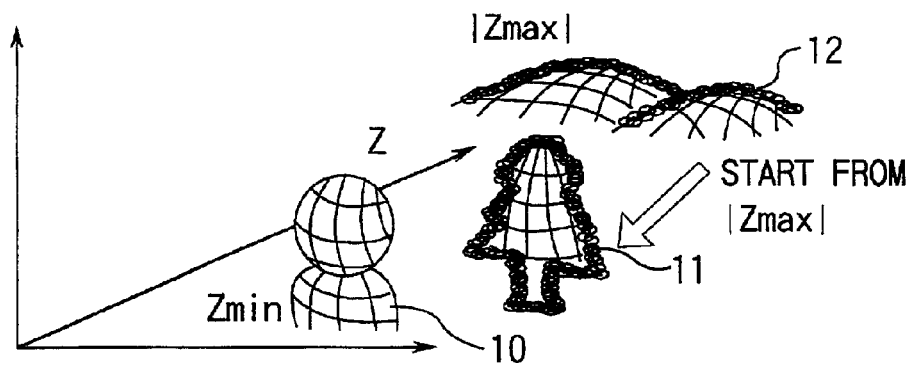
FIG. 10C is a view showing another solution to "occlusion" in FIG. 10A.

FIG. 10C shows another solution.

As shown in FIG. 10C, since an image has depth information in units of pixels, processing starts from a pixel having a large absolute value of Z.

In this example, processing starts from the farthest pixel of the mountain image 12. Then, the tree image 11 and person image 10 are sequentially processed.

Also in this case, some of the following processes are required.

When the near object 10 is in focus, color information farther than the pixel is discarded and replaced with a new near object color.

When the near object 10 is not in focus, the periphery representing the blur state of the object is partially made transparent, as needed. Then, a new near object color is add to color information farther than the pixel.

FIGS. 11A to 13 are views for explaining detailed processing in the first embodiment.

FIGS. 11A to 13 show images on the display of an actual computer, but may be the liquid crystal display of a camera.

Figure 11A:
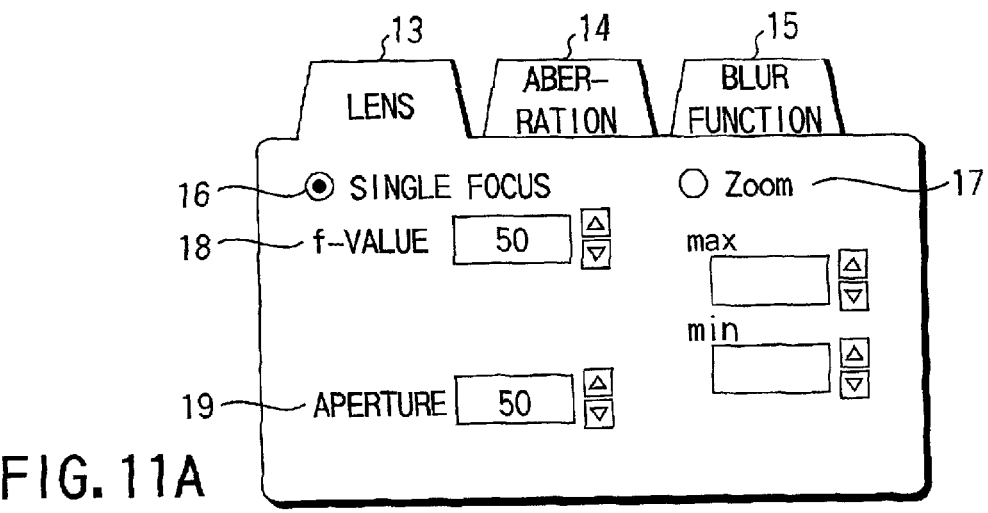
FIG. 11A is a view showing a window for first setting lens characteristics in order to explain detailed processing in the first embodiment.
Figure 11B:
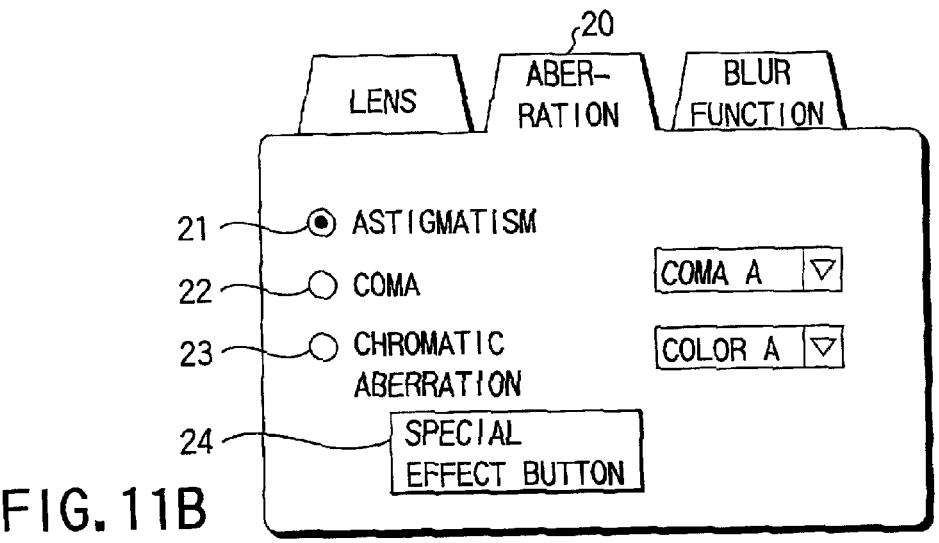
FIG. 11B is a view showing a window for setting aberration.
Figure 11C:
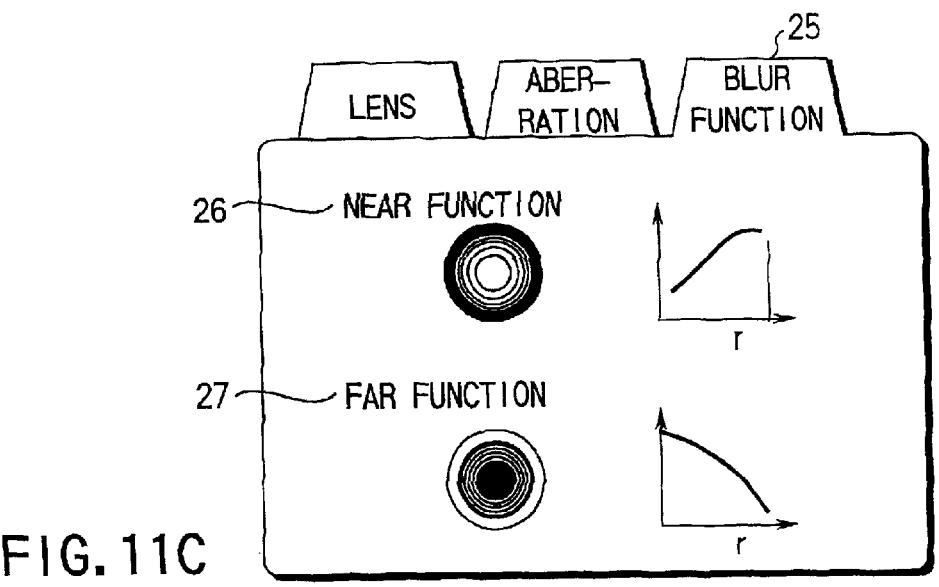
FIG. 11C is a view showing a function of setting the shape of a point spread function within a confusion circle as a blur function.

FIGS. 11A to 11C show windows for setting lens characteristics.

By setting a default value in advance, the user need not set lens information.

In this example, three characteristics, i.e., the lens, aberration, and blur function are set.

FIG. 11A shows a window 13 for setting the lens.

In this case, whether the lens has a single focus 16 or zoom 17 is selected.

When the single-focus lens is selected, an f-number 18 is input. When the zoom is selected, maximum and minimum f-numbers are input. The f-number may be numerically input or may be selected for data presented to the user.

Then, a lens aperture 19 is similarly input.

FIG. 11B shows a window for setting aberration.

By clicking an aberration tag 20, the window is switched to the aberration setting window.

This window is used to select any one of astigmatism 21, coma 22, and chromatic aberration 23. For coma and chromatic aberration, the type of aberration can be selected.

For coma, the degree of shift from the center can be selected. For chromatic aberration, the components of red, blue, and the like, and the aberration strength can be selected.

This strength may be set using a volume or the like. If a special effect button 24 is used, a filter effect may be obtained.

For example, in a single-lens reflex camera, when the stop is stopped down, the polygon (hexagon) of the stop functions as a filter, and strong reflection or the like appears on a window with this polygonal shape.

The aberration can assume this effect or an effect as if the user freely used a filter.

By setting the respective aberrations, a plurality of effects can be simultaneously obtained.

For example, if astigmatism and coma are selected, their effects can be simultaneously exhibited.

In FIG. 11B, coma is selected from several set patterns. Alternatively, the user may set coma parameters by himself.

FIG. 11C shows a function of setting the shape of a point spread function within a confusion circle.

FIG. 11C shows only settings of the most important astigmatism, but the same method is adopted for the coma and chromatic aberrations.

In FIG. 11C, a near function 26 represents a blur state nearer than the in-focal point position, and a far function 27 represents a farther blur state.

As the initial setting value, the near function takes a value smaller at the center than the periphery as a concave function, and the far function takes a value larger at the center than the periphery as a convex function. This is a lens characteristic and can be freely changed.

The function can be freely set by the user except that the radius of a confusion circle determined by a computer is rotation-symmetrical owing to the astigmatism.

To set the function, although the user may input a figure, he/she can designate a value in the direction of radius (r) with a mouse, and drag the function to freely change the function.

Note that the function is normalized so that its integral is constant.

The actually calculated function may be different from the function on the window.

To present an easy-to-recognize function, $G(r)$, $G(r)/r$, or $G(r)/r^2$ may be adopted.

Figure 12:
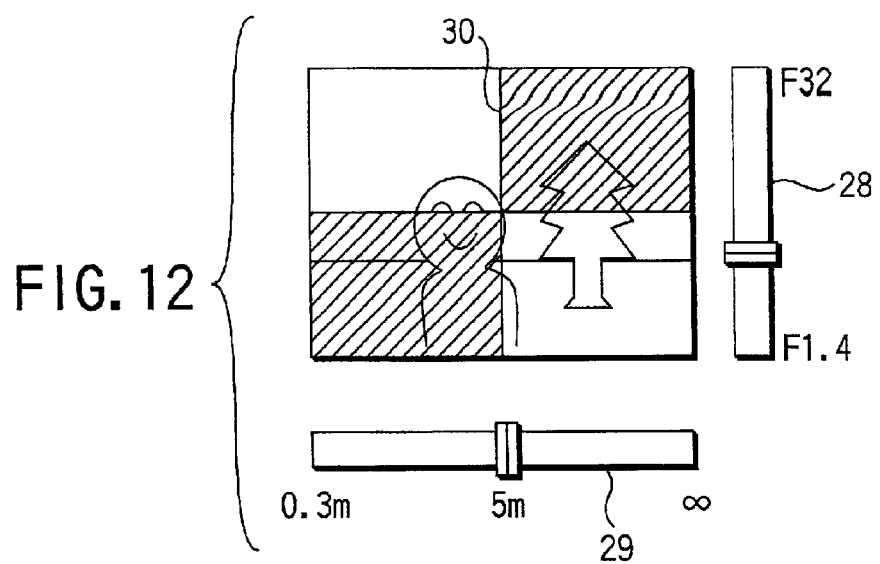
FIG. 12 is a view showing parameter setting (step S3) of a virtual camera and setting (step S4) of a focal point position shown in FIG. 8.

FIG. 12 shows parameter setting (step S3) of the virtual camera and setting (step S4) of the focal point position shown in FIG. 8.

For a simple arrangement and user's convenience, these settings can be done on a single display.

In this example, the user can set an F-number 28 and focal point position 29 by adjusting volumes (28 and 29).

For example, if the user wants to emphasize a blur, he/she decreases the F-number to 1.4.

By setting this value, D is calculated by equation (9) using a predetermined f-number, and applied to equations (5) and (8).

The image shown in FIG. 12 is a window for a monitor (not shown).

If all the pixels are used for the monitor window, an enormous amount of calculation must be executed, which takes a long time until results are obtained.

Hence, only some of all the pixels are used.

For example, when an image is made up of 480×640 pixels for VGA, these pixels are thinned out to ⅕, i.e., 96×128. At the same time, this window is divided into four quadrants (30).

Of the four quadrants, e.g., the second and fourth quadrants display images before processing, and the first and third quadrants display images after processing.

Calculation can be completed almost in real time for this number of pixels, and changes in F-number and focal point position can be confirmed.

The user can freely determine the F-number and focus for the virtual camera regardless of an actual camera.

Upon completion of the setting, an "OK" button (not shown) is clicked to start calculation of all the pixels. The results are displayed, and if necessary, printed or stored in the storage device 9.

Figure 13:
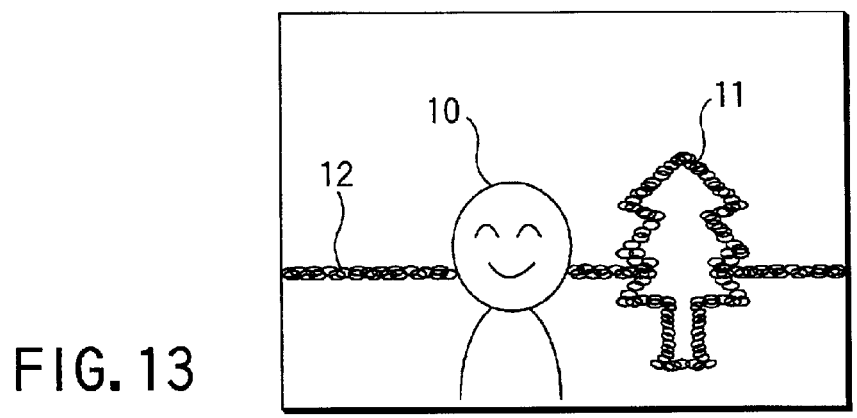
FIG. 13 is a view showing a final image obtained by finally determined parameters.

FIG. 13 shows a final image obtained by finally determined parameters.

The person image 10 to which the focus is adjusted is clear, and the tree image 11 is blurred properly roundly and naturally.

This blur can be freely changed by changing the blur function shape of astigmatism. The blur is natural because its amount is based on the lens theory. The degree of blur depends on the lens properties.

For a relatively sharp lens, the blur function is almost Gaussian. For a soft lens, the bright portion becomes round to give a good texture.

By adding coma, the background image fades off, resulting in a natural image like the one sensed by the human eye. This influence can also be freely set.

Especially, this effect changes depending on various physical factors such as perspective, and thus an image becomes very natural.

Chromatic aberration is a phenomenon in which a blurred portion shifts to red or blue. This phenomenon is also natural for the visual sense, and can attain many effects.

Second Embodiment

Figure 14:
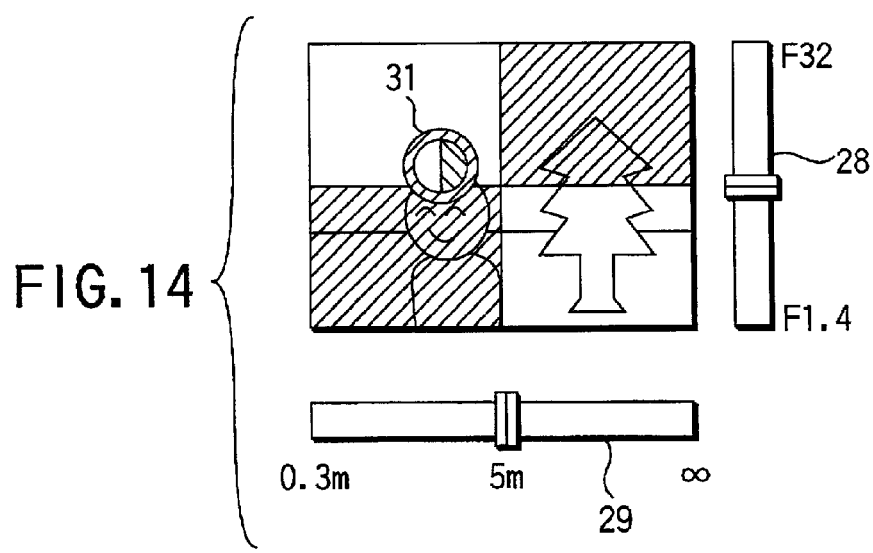
FIG. 14 is a view showing the second embodiment.

FIG. 14 shows the second embodiment.

The basic concept and arrangement method of the second embodiment are the same as in the first embodiment.

FIG. 14 shows the embodiment for the example of FIG. 12 in which the user interface is enhanced.

In the first embodiment, the focal point position is set with a volume. In the second embodiment, distance information has already been set in units of pixels. By setting a position to get into focus, the distance from it should be obtained.

In this embodiment, the F-number is set with a volume, and the focus is adjusted to the head of a person image 31.

Depth information of the head position is calculated to obtain Z, and a volume position 29 at the lower portion in FIG. 14 automatically moves to determine the focal point position.

Since distance information in units of pixels includes errors, distances near a designated point may be averaged. The radius or number of pixels subjected to averaging may be separately set.

Upon completion of the setting, an "OK" button (not shown) is clicked to start calculation of all the pixels. The results are displayed, and if necessary, printed or stored in a storage device 9.

Third Embodiment

Figure 15:
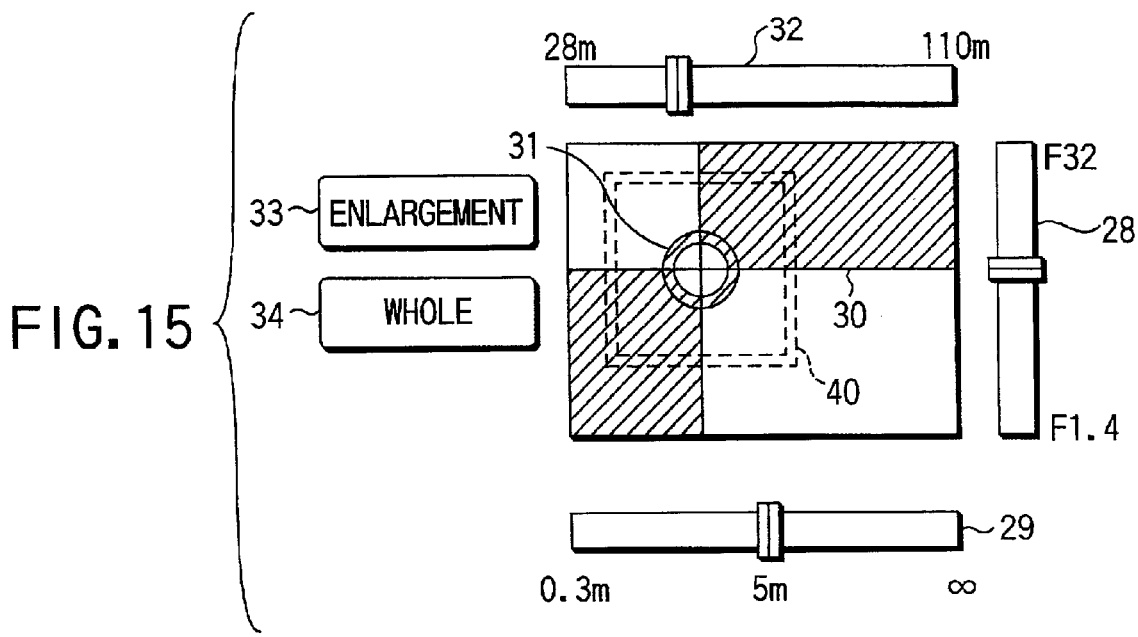
FIG. 15 is a view showing the third embodiment.

FIG. 15 shows the third embodiment.

The basic concept and arrangement method of the third embodiment are the same as in the first embodiment.

FIG. 15 shows the embodiment in which the user interface is enhanced with a zoom function.

In the first embodiment, a zoom 32 determines the focal length of the lens. In FIG. 15, the zoom 32 can be set at the upper portion of the window.

The displayed maximum and minimum focal lengths are set by lens settings.

By changing the zoom ratio, an image may be enlarged and displayed at the center. Instead, to designate a desired field angle within the entire image, an object image 31 to get into focus is designated with a mouse or the like in FIG. 15.

The focal point position is determined using the distance to a designated pixel of the object (or the average of several pixels).

When the zoom ratio is increased, an outer frame 40 within the field angle appears to display the target field angle. In this example, the focal point position appears on a volume 29.

If an F-number 28, the zoom 32, and the focal point position 29 are determined, expressing including a blur state is determined, and thus an image can be processed.

In this case, an area 30 automatically divided at the central position appears to represent a processing state.

In FIG. 15, reference numeral 33 denotes an enlargement button; and 34, a whole button. By clicking the enlargement button 33, the whole outer frame 40 appears on the window to represent a zoom state.

By clicking the whole button 34, an image can be processed while the entire image before enlargement and zoom is displayed.

Upon completion of the setting, an "OK" button (not shown) is clicked to start calculation of all the pixels. The results are displayed, and if necessary, printed or stored in a storage device 9.

Fourth Embodiment

Figure 16A:
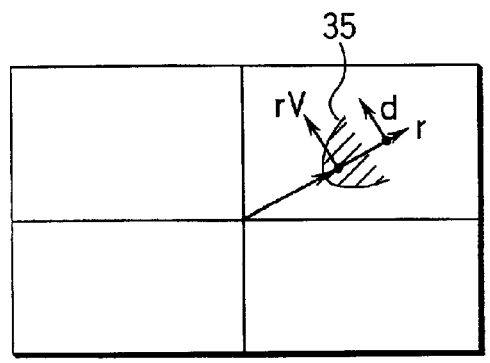
FIG. 16A is a view showing a coma characteristic and expression method in order to explain the fourth embodiment.
Figure 16B:
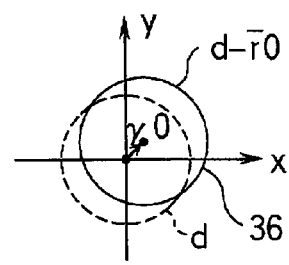
FIG. 16B is a view showing another simpler example of the coma characteristic and expression method in order to explain the fourth embodiment.

FIGS. 16A and 16B show the fourth embodiment.

The basic concept and arrangement method of the fourth embodiment are the same as in the first embodiment. In the fourth embodiment, a coma characteristic is set in setting lens characteristics.

FIG. 16A shows a coma characteristic and expression method. Reference numeral 35 denotes a coma characteristic.

Coma represents radial distortion of an image when the image shifts from the center of the lens. FIG. 16A shows aberration at a distance r from the center.

This aberration radially extends outward from the center. In the fourth embodiment, the aberration is represented by a parabola using the central position (pixel of interest) as a focus in order to express aberration extending radially from the center, like the coma characteristic 35.

A line is drawn from the pixel to the center of the window. Letting r be the normal direction, and rv be the vertical direction, the parabola is given by a quadratic curve with respect to rv. The parabola is approximated by a function which ends the parabola at a distance d in the direction rv. Another example is more simply a confusion circle 36 having a radius d. A method of deriving a blur function as astigmatism is the same as in FIG. 16A. Alternatively, the center of the confusion circle 36 may be shifted by ro from a pixel of interest, as shown in FIG. 16B.

In this case, ro may be set as a default value or by a user.

The value ro is a function of r, and basically a linear function of r. The value ro becomes larger as it moves outward.

Coma fades toward the periphery of the window.

In general, the lens is designated to reduce coma. However, coma is close to the human visual sense. By virtually adding coma, like the fourth embodiment, a very-high-quality image can be expressed.

Furthermore, very natural image expression close to the human visual sense can be attained by not simply blurring the image periphery, but combining depth, blur, and another aberration in consideration of depth information, like the fourth embodiment.

In the fourth embodiment, the variable r of PSF changes within the range of the size d of the confusion circle.

However, the variable r need not always change within the range of d. In short, the possible range of the variable r of PSF need only increase for a large confusion circle, and decrease for a small confusion circle.

Fifth Embodiment

Figure 17A:
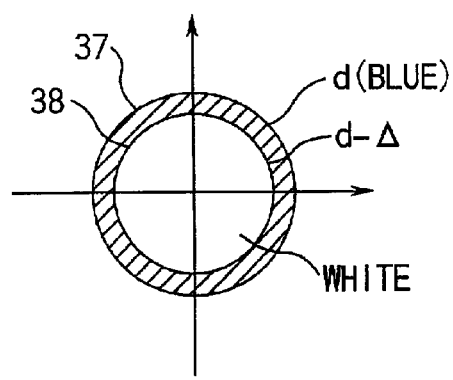
FIG. 17A is a view showing the magnitude of a blur function determined by a radius d of a confusion circle 37 as an example of emphasizing blue in order to explain the fifth embodiment.
Figure 17B:
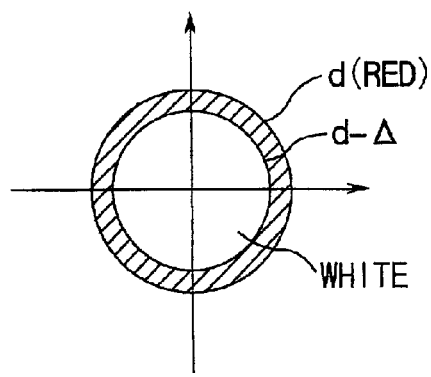
FIG. 17B is a view showing an example of emphasizing red in order to explain the fifth embodiment.

FIGS. 17A and 17B show the fifth embodiment.

The basic concept and arrangement method of the fifth embodiment are the same as in the first embodiment. In the fifth embodiment, a chromatic aberration characteristic is set in setting lens characteristics.

FIGS. 17A and 17B show a chromatic aberration characteristic and expression method. FIG. 17A exemplifies the size of a blur function determined by a radius d of a confusion circle 37.

In FIG. 17A, reference numeral 38 denotes an inner circle.

The inner color of the inner circle 38 is that of a central pixel. In an outer range d–Δ, blue is emphasized in the example of FIG. 17A, and red is emphasized in the example of FIG. 17B.

This chromatic aberration provides an image reddish or bluish at the window periphery.

In general, the lens is designed to reduce chromatic aberration. However, chromatic aberration is close to the human visual sense. Thus, chromatic aberration virtually added in the fifth embodiment can express a very-high-quality image.

Moreover, very natural image expression close to the human visual sense can be attained by not simply blurring the image periphery, but combining depth, blur, and another aberration in consideration of depth information in the fifth embodiment.

Sixth Embodiment

Figure 18A:
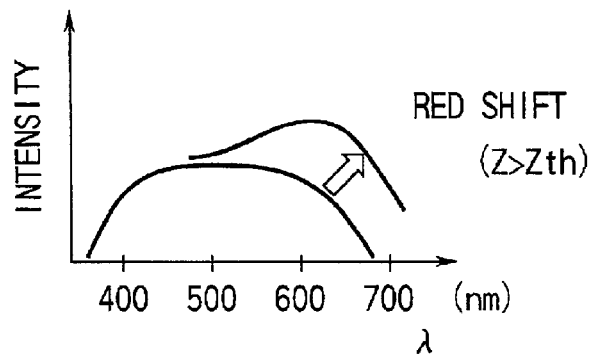
FIG. 18A is a view showing a red shift in order to explain a color dispersion characteristic of air and expression method according to the sixth embodiment.
Figure 18B:
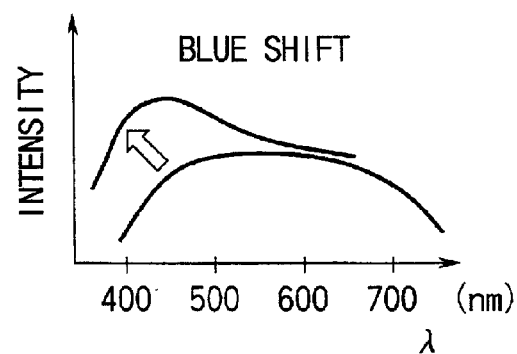
FIG. 18B is a view showing a blue shift in order to explain the color dispersion characteristic of air and expression method according to the sixth embodiment.

FIGS. 18A and 18B show the sixth embodiment.

The basic concept and arrangement method of the sixth embodiment are the same as in the first embodiment. In setting lens characteristics, a color dispersion characteristic in air is set.

Color dispersion in air is not originally a lens characteristic, but can be set as a lens characteristic to achieve the same effect.

The state of air greatly changes depending on the time and place. For example, on a mountain on a fine day, the amount of ultraviolet rays is large, and a far place looks bluish.

Depending on the azimuth between the sun and the optical axis of the lens, many polarization components may be contained.

Near the skyline or horizon, red components are emphasized by a dust dispersion characteristic in air, resulting in a sunset or sunrise image.

FIGS. 18A and 18B show a color dispersion characteristic of air and expression method. FIG. 18A shows a red shift.

In this example, when the distance has a certain depth or more, the red range is emphasized.

In this case, a threshold Zth of Z is set. Alternatively, the red shift amount may be increased stepwise in accordance with the level of Z.

FIG. 18B shows a blue shift.

In this example, when the distance has a certain depth or more, the blue range is emphasized.

In this case, the threshold Zth of Z is set. Alternatively, the blue shift amount may be increased stepwise in accordance with the level of Z.

Accordingly, the sixth embodiment can apply natural perspective later.

In general, a landscape is often photographed using a polarizing filter which adds higher contrast and better color than actual ones to far image portions. In practice, the quality of a far image is low.

In the sixth embodiment, an image can be easily improved by simulating a clear day, cloudy day, evening, and the like.

Capturing information in the direction of depth realizes natural expression. The user can enjoy photographing in combination with a blur or the like.

Seventh Embodiment

Figure 19A:
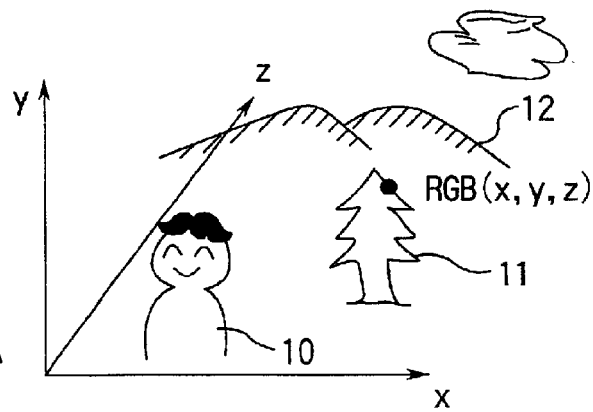
FIG. 19A is a view showing an example of inputting not depth information in units of pixels but distance information in units of given objects in order to explain the seventh embodiment.
Figure 19B:
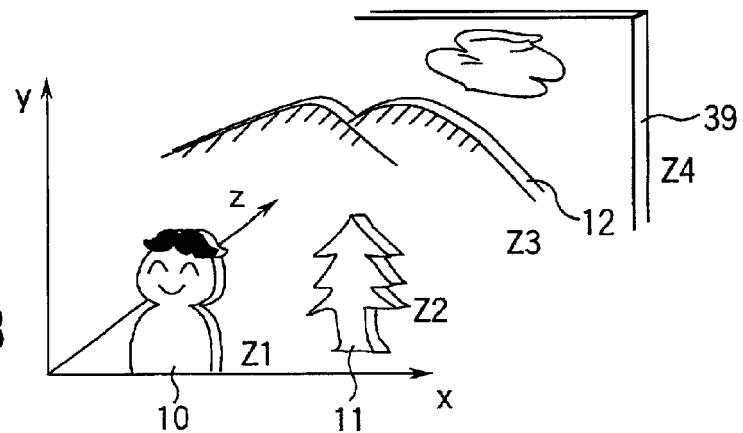
FIG. 19B is a view showing a simpler example of applying one depth information to a given set of objects and applying the same information in units of objects in order to explain the seventh embodiment.

FIGS. 19A and 19B show the seventh embodiment.

The basic concept and arrangement method of the seventh embodiment are the same as in the first embodiment. The seventh embodiment will exemplify another data input means.

In the first embodiment, input data has depth information in units of pixels. At present, however, it is difficult to construct a low-cost camera which is capable of accurately obtaining both depth information and image information at a high speed like a general camera, and which is inexpensive. Such camera is either expensive or requires a long time to obtain depth information and image information.

In general, data input employs an active method and passive method.

The active method includes a laser interferometer measurement method, a light cut-off method, and a moiré method. According to the active method, an object is actually irradiated with light or the like to measure depth information. Thus, the measurement device becomes large in size, and a long time is required to obtain depth information together with image information.

According to the passive method, depth information is measured using an image captured by a camera. The passive method includes a stereoscopic viewing method, multi-lens viewing method, and phase difference method.

As for the camera, the passive method is more ideal. However, in a dark place, the measurement precision decreases, or the distance cannot uniquely determined depending on the image to be processed.

FIG. 19A shows an example of the seventh embodiment.

In this example, distance information is input in units of objects instead of depth information in units of pixels. The depth information may be in units of pixels or sets of areas.

In this case, the image is divided into a person image 10, tree image 11, and mountain image 12, and each image is provided with depth information. To measure depth information by the active method, a near object, farther object, and background may be separately photographed to input distance information in units of objects. Alternatively, the measurement method may change depending on the object to be processed.

This also applies to the passive method. The passive method is an important data preparation means when depth information cannot be calculated by only stereoscopic matching in units of objects, and an object is determined from a plurality of physical quantities such as color and texture.

FIG. 19B shows a simpler example.

In this case, one depth information is assigned to a given object unit like animation.

In this example, each of the person image 10, tree image 11, object image 12, and a sky image 39 has the same information such as Z1, Z2, Z3, or Z4 as a plate-like image. This process is used when the depth is measured by a very simple measurement device or at a plurality of points on a measurement display.

Even when an object is segmented by cutting out a two-dimensional image in accordance with the gradation, color, or user' intention, software for executing this embodiment can be applied by adding depth information later.

In this case, cut-out of the window and setting of the depth in units of objects may be contained in software for executing this embodiment.

The present invention exemplified by the above-described embodiments include the following appendixes (1) to (23) in addition to the first to =seventh embodiments.

Appendix (1): An image processing apparatus for assuming the characteristic of a virtual image sensing optical system, and applying a blur effect corresponding to an in-focus state to a captured image, is characterized by comprising an image input means for capturing image information including distance information to each portion of an object to be photographed, a parameter input means for inputting a parameter from which the effective aperture and focal length of the assumed image sensing optical system can be derived, an in-focal point position designation means for designating the in-focal point position of the assumed image sensing optical system, a confusion circle calculation means for calculating a confusion circle from the distance information input by the image input means, the in-focal point position designated by the in-focal point position designation means, and the parameter input by the parameter input means, a blur state calculation means for calculating a blur state using a point spread function (PSF) within a range corresponding to the size of the confusion circle calculated by the confusion circle calculation means, and an image processing means for applying the blur effect to the image input by the image input means in correspondence with the blur state calculated by the blur state calculation means.

Appendix (2): An image processing method of assuming the characteristic of a virtual image sensing optical system, and applying an effect corresponding to a blur corresponding to an in-focus state to a captured image, is characterized by comprising the step of capturing image information including distance information to each portion of an object to be photographed, the step of inputting a parameter from which the effective aperture and focal length of the assumed image sensing optical system can be derived, the step of designating the in-focal point position of the assumed image sensing optical system, the step of calculating a confusion circle from the input distance information, the designated in-focal point position, and the input parameter, the blur step of calculating a blur state using a point spread function (PSF) within a range corresponding to the size of the calculated confusion circle, and the step of applying the blur effect to the input image in correspondence with the calculated blur state.

Appendix (3): A storage medium for a computer-readable program stored to assume the characteristic of a virtual image sensing optical system and apply an effect equivalent to blur corresponding to an in-focus state to a captured image in an image processing apparatus, is characterized by comprising a first computer-readable program means for providing a computer with a function of capturing image information including distance information to each portion of an object to be photographed, a second computer-readable program means for providing the computer with a function of inputting a parameter from which the effective aperture and focal length of the assumed image sensing optical system can be derived, a third computer-readable program means for providing the computer with a function of designating an in-focal point position of the assumed image sensing optical system, a fourth computer-readable program means for providing the computer with a function of calculating a confusion circle from the input distance information, the designated in-focal point position, and the input parameter, a fifth computer-readable program means for providing the computer with a function of calculating a blur state using a point spread function (PSF) within a range corresponding to the size of the calculated confusion circle, and a sixth computer-readable program means for providing the computer with a function of applying the blur effect to the input image in correspondence with the calculated blur state.

Appendix (4): A storage medium for a computer-readable program stored to apply a blur effect to a captured image in an image processing apparatus, is characterized by comprising a first computer-readable program means for providing a computer with a function of capturing image information including distance information to each portion of an object to be photographed, and a second computer-readable program means for providing the computer with a function of applying the blur effect to the input image by overwrite sequentially from an image portion having far distance information.

Appendix (5): An image processing apparatus is characterized by comprising a means for inputting image data including depth information, a means for setting a parameter for expressing a lens characteristic, a means for setting any one of a focal length, F-number, field angle, and effective aperture, a means for setting a distance for adjusting the focus, a means for calculating expression of an image texture including a blur from the virtual camera setting values and the depth information of the image, and a means for storing a calculation result in a memory.

Appendix (6): An image processing apparatus according to appendix (5) is characterized by further comprising means for inputting an image having depth information in units of pixels of a two-dimensional image.

(Corresponding Mode of Carrying Out the Invention)

The corresponding mode is described in the first embodiment.

(Function and Advantage)

Only image data including photographed depth information is input, and a virtual camera can be constituted by only set lens information and a position to get into focus.

This virtual camera can express a natural stereoscopic impression and blur, and the texture state by changing photographing conditions and setting lens characteristics.

Appendix (7): An image processing apparatus according to appendix (5) is characterized in that the blur function is a point spread function (PSF) calculated in units of pixels from the focal length of a lens, the F-number or aperture, the object distance, and the depth information of the image.

Appendix (8): An image processing apparatus according to appendix (5) is characterized in that the blur function has a variable function shape, and is a concave function or convex function determined by a focal point position and an object distance to be calculated.

(Corresponding Mode of Carrying Out the Invention)

The corresponding mode is described in the first embodiment.

(Function and Advantage)

Only image data including photographed depth information is input, and a virtual camera can be constituted by only set lens information and a position to get into focus.

This virtual camera can express a natural stereoscopic impression and blur, and attain an ideal texture and artificial texture by changing photographing conditions and setting lens characteristics.

Appendix (9): An image processing apparatus according to appendix (5) is characterized in that a user can freely change, with a volume, the F-number and a focal point position designated by the user, and a calculation result using a thumbnail image obtained by thinning out an input image is displayed to interactively obtain confirmable parameter setting.

(Corresponding Mode of Carrying Out the Invention)

The corresponding mode is described in the first embodiment.

(Function and Advantage)

Only image data including photographed depth information is input, and a virtual camera can be constituted by only set lens information and a position to get into focus.

By this virtual camera, a desired object distance can be interactively set while an intermediate result is confirmed.

Appendix (10): An image processing apparatus according to appendix (5) or (9) is characterized in that a user designates a position on a window to determine a focal point position using depth information of the window.

Appendix (11): An image processing apparatus according to appendix (5) or (11) is characterized in that a user freely changes the F-number with a volume while designating a focal point position on a designated window, and a calculation result using a thumbnail image obtained by thinning out an input image is displayed to interactively obtain parameter setting capable of confirming designation of the focal point position and F-number.

Appendix (12): An image processing apparatus according to appendix (5) is characterized in that a user can change a zoom ratio by changing an f-number.

Appendix (13): An image processing apparatus according to appendix (5) is characterized in that the central point of a zoom and a position to get into focus are set in setting a zoom ratio, and the central coordinates of the zoom and the depth information of the point are used to calculate enlargement on a window and a blur state or to interactively determine a parameter.

(Corresponding Mode of Carrying Out the Invention)

The corresponding mode is described in the second embodiment.

(Function and Advantage)

Only image data including photographed depth information is input, and a virtual camera can be constituted by only set lens information and a position to get into focus.

By this virtual camera, only a position to get into focus can be set to focus on that position. Another stereoscopic impression and texture can be interactively set while an intermediate result is confirmed.

Appendix (14): An image processing apparatus according to appendix (13) is characterized in that an outer frame in an area to be enlarged and displayed without changing a display ratio is displayed in setting the zoom ratio.

Appendix (15): An image processing apparatus according to appendix (5) is characterized in that a window is enlarged based on the central coordinates of a zoom designated by a user, a focal point position on the window is designated to determine the focal point position, the F-number is freely changed with a volume, and a calculation result using a thumbnail image obtained by thinning out an input image is displayed to interactively obtain parameter setting capable of confirming designation of the central position of the field angle, the zoom ratio, and the F-number.

(Corresponding Mode of Carrying Out the Invention)

The corresponding mode is described in the third embodiment.

(Function and Advantage)

Only image data including photographed depth information is input, and a virtual camera can be constituted by only set lens information and a position to get into focus.

By this virtual camera, only a position to get into focus and a zoom ratio can be set to focus on that position and zoom. Another stereoscopic impression and texture can be interactively set while an intermediate result is confirmed.

Appendix (16): An image processing apparatus according to appendix (15) is characterized in that the blur state is expressed using the influence of coma which changes depending on the distance and azimuth from the center of an image.

Appendix (17): An image processing apparatus according to appendix (5) or (16) is characterized in that an asymmetrical point spread function is calculated for coma using a blur function obtained by shifting the central position of the radius of a confusion circle in accordance with the distance from the central position of an image.

(Corresponding Mode of Carrying Out the Invention)

The corresponding mode is described in the fourth embodiment.

(Function and Advantage)

Only image data including photographed depth information is input, and a virtual camera can be constituted by only set lens information and a position to get into focus.

This virtual camera can adopt the influence of the coma, and can achieve an image texture like the one obtained by the human visual sense.

Appendix (18): An image processing apparatus according to appendix (5) is characterized in that the influence of chromatic aberration is adopted.

Appendix (19): An image processing apparatus according to appendix (5) or (18) is characterized in that a range d–Δ from d on a point spread function for the radius (d) of a symmetrical confusion circle is set as a chromatic aberration influence range, and red aberration or blue aberration is applied.

(Corresponding Mode of Carrying Out the Invention)

The corresponding mode is described in the fifth embodiment.

(Function and Advantage)

Only image data including photographed depth information is input, and a virtual camera can be constituted by only set lens information and a position to get into focus.

This virtual camera can adopt the influence of chromatic aberration, and can achieve an image texture like a bluish one obtained by the human visual sense.

Appendix (20): An image processing apparatus according to appendix (5) is characterized in that the influence of a color shift in air is used.

Appendix (21): An image processing apparatus according to appendix (5) or (20) is characterized in that the blue range or red range of a color characteristic at a given distance or more is emphasized or decreased.

(Corresponding Mode of Carrying Out the Invention)

The corresponding mode is described in the sixth embodiment.

(Function and Advantage)

Only image data including photographed depth information is input, and a virtual camera can be constituted by only set lens information and a position to get into focus.

This virtual camera can adopt the influence of color dispersion in air, and can achieve an image texture like the one obtained by a natural sense such that the vicinity of the horizon becomes reddish.

Appendix (22): An image processing apparatus according to appendix (5) is characterized by further comprising a means for inputting, as a set of units, depth information and image information in units of pixels or areas for each object.

Appendix (23): An image processing apparatus according to appendix (5) is characterized in that an input image is a set of objects having a predetermined distance in units of not pixels but sets of objects.

(Corresponding Mode of Carrying Out the Invention)

The corresponding mode is described in the seventh embodiment.

(Function and Advantage)

Only image data including photographed depth information is input, and a virtual camera can be constituted by only set lens information and a position to get into focus.

Processing according to the present invention is done for an input to the virtual camera including an image formed by processing a general two-dimensional image, an easily obtained three-dimensional measurement image, an image obtained by a 3D authoring tool, and an animation image.

According to the mode described in the first embodiment, it is possible to focus on a desired portion of an input image, and apply a desired blur to the remaining portion in correspondence with the distance.

Even an image focused on the entire window, like an image photographed by a compact camera, can be processed into an image having a blur, like an image photographed by an expensive single-lens reflex camera.

According to the modes described in the first and fourth embodiments, the blur is natural because a virtual optical system is assumed.

According to the modes described in the first and fourth embodiments, it is possible to freely designate an in-focal point position, and thus freely blur a far view or near view.

According to the modes described in the first and fourth embodiments, the blur can be reproduced in an arbitrary virtual optical system.

According to the modes described in the second to fifth embodiments, "occlusion" generated in applying a blur can be removed.

According to the mode described in the third embodiment, the blur can be applied to the entire window after the blur effect is confirmed at part of the window. This increases the processing efficiency.

As has been described above, the present invention can provide an image processing system capable of contributing to implementation of a digital camera system capable of solving the conventional problems and practically improving the texture of a digital camera serving as a virtual camera, thereby effectively applying a texture such as a blur.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
   an image input unit for capturing image information including distance information to each portion of an object to be photographed;
   a parameter input unit for inputting a parameter from which an effective aperture and focal length of the an assumed image sensing optical system can be derived;
   an in-focal point position designation unit for designating an in-focal point position of the assumed image sensing optical system;
   a blur state calculation unit for calculating a blur state from the distance information input by said image input unit, the in-focal point position designated by said in-focal point position designation unit, and the parameter input by said parameter input unit; and
   an image processing unit for applying a blur effect to the image input by said image input unit in correspondence with the blur state calculated by said blur state calculation unit;
   wherein the in-focal Point position designated by said in-focal point position designation unit is determined using the distance information included in the image information, based on a position which is designated by a user in an image corresponding to the image information.

2. An image processing apparatus comprising:
   an image input unit for capturing image information including distance information to each portion of an object to be photographed;
   a parameter input unit for inputting a parameter from which an effective aperture and focal length of an assumed image sensing optical system can be derived;
   an in-focal point position designation unit for designating an in-focal point position of the assumed image sensing optical system;
   a confusion circle calculation unit for calculating a confusion circle from the distance information input by said image input unit, the in-focal point position designated by said in-focal point position designation unit, and the parameter input by said parameter input unit;
   a blur state calculation unit for calculating a blur state using a point spread function within a range corresponding to a size of the confusion circle calculated by said confusion circle calculation unit; and
   an image processing unit for applying a blur effect to the image input by said image input unit in correspondence with the blur state calculated by said blur state calculation unit;
   wherein the in-focal point position designated by said in-focal point position designation unit is determined using the distance information included in the image information, based on a position which is designated by a user in an image corresponding to the image information.

3. An image processing method comprising:
   capturing image information including distance information to each portion of an object to be photographed;
   inputting a parameter capable of deriving an effective aperture and focal length of an assumed image sensing optical system;
   designating an in-focal point position of the assumed image sensing optical system;
   calculating a blur state from the input distance information, the designated in-focal point position, and the input parameter; and
   applying a blur effect to the input image in correspondence with the calculated blur state;
   wherein the in-focal point position designated by said in-focal point position designation unit is determined using the distance information included in the image information, based on a position which is designated by a user in an image corresponding to the image information.

4. An image processing method comprising:
   capturing image information including distance information to each portion of an object to be photographed;
   inputting a parameter from which an effective aperture and focal length of the an assumed image sensing optical system can be derived;
   designating an in-focal point position of the assumed image sensing optical system;
   calculating a confusion circle from the input distance information, the designated in-focal point position, and the input parameter;
   calculating a blur state using a point spread function within a range corresponding to a size of the calculated confusion circle; and
   applying a blur effect to the input image in correspondence with the calculated blur state;
   wherein the in-focal point position designated by said in-focal point position designation unit is determined using the distance information included in the image information, based on a position in an image which is designated by a user.

5. A computer-readable storage medium having computer-readable program code means stored thereon, said computer-readable program code means comprising:
   first computer-readable program means for providing a computer with a function of capturing image information including distance information to each portion of an object to be photographed;
   second computer-readable program means for providing the computer with a function of inputting a parameter from which an effective aperture and focal length of the an assumed image sensing optical system can be derived;
   third computer-readable program means for providing the computer with a function of designating an in-focal point position of the assumed image sensing optical system;
   fourth computer-readable program means for providing the computer with a function of calculating a blur state from the input distance information, the designated in-focal point position, and the input parameter; and
   fifth computer-readable program means for providing the computer with a function of applying a blur effect to the input image in correspondence with the calculated blur state;
   wherein the in-focal point position designated by said in-focal point position designation unit is determined using the distance information included in the image information, based on a position which is designated by a user in an image corresponding to the image information.

6. A computer-readable storage medium having computer-readable program code means stored thereon, said computer-readable program code means comprising:

first computer-readable program means for providing a computer with a function of capturing image information including distance information to each portion of an object to be photographed;

second computer-readable program means for providing the computer with a function of inputting a parameter from which an effective aperture and focal length of an assumed image sensing optical system can be derived;

third computer-readable program means for providing the computer with a function of designating an in-focal point position of the assumed image sensing optical system;

fourth computer-readable program means for providing the computer with a function of calculating a confusion circle from the input distance information, the designated in-focal point position, and the input parameter;

fifth computer-readable program means for providing the computer with a function of calculating a blur state using a point spread function within a range corresponding to a size of the calculated confusion circle; and sixth computer-readable program means for providing the computer with a function of applying a blur effect to the input image in correspondence with the calculated blur state;

wherein the in-focal point position designated by said in-focal point position designation unit is determined using the distance information included in the image information based on a position which is designated by a user in an image corresponding to the image information.

7. An image processing apparatus comprising:

means for inputting image data including depth information;

means for setting a parameter for expressing a lens characteristic;

means for setting one of a focal length, F-number, field angle, and effective aperture;

means for setting a distance in focus;

means for calculating expression of an image texture including a blur from virtual camera setting values and the depth information of the image; and means for storing a calculation result in a memory wherein an in-focal point position is determined using the depth information included in the image data based on a position designated by a user in an image corresponding to the image data.

8. An apparatus according to claim 7, further comprising means for inputting an image having depth information in units of pixels of a two-dimensional image.

9. An apparatus according to claim 7, wherein a blur function is a point spread function calculated in units of pixels from the focal length of a lens, the F-number or aperture, an object distance, and the depth information of the image data.

10. An apparatus according to claim 7, wherein a blur function has a variable function shape, and is one of a concave function or and a convex function determined by a focal point position and an object distance to be calculated.

11. An apparatus according to claim 7, wherein the F-number and a focal point position designated by the user are adapted to be changeable by the user with a sliding switch, and wherein a calculation result using a thumbnail image obtained by thinning out an input image is displayed to interactively obtain a confirmable parameter setting.

12. An apparatus according to claim 7, wherein the F-number is adapted to be changeable by the user with a sliding switch while the user designates a focal point position on a designated window, and wherein a calculation result using a thumbnail image obtained by thinning out an input image is displayed to interactively obtain a parameter setting which is adapted to confirm designation of the focal point position and the F-number.

13. An apparatus according to claim 7, wherein a zoom ratio is adapted to be changed by the user by changing an f-number.

14. An apparatus according to claim 7, wherein a central point of a zoom and a position to get into focus are set in setting a zoom ratio, and wherein central coordinates of the zoom and depth information of the central point are used to one of calculate a blur state and an enlargement on a window and to interactively determine a parameter.

15. An apparatus according to claim 14, wherein an outer frame in an area to be enlarged and displayed without changing a display ratio is displayed in setting the zoom ratio.

16. An apparatus according to claim 7, wherein a window is enlarged based on central coordinates of a zoom designated by a user, a focal point position on the window is designated to determine the focal point position, the F-number is freely changed with a sliding switch, and a calculation result using a thumbnail image obtained by thinning out an input image is displayed to interactively obtain a parameter setting which is adapted to confirm designation of a central position of the field angle, a zoom ratio, and the F-number.

17. An apparatus according to claim 7, wherein a blur state is expressed using influence of coma which changes depending on a distance and azimuth from a center of an image.

18. An apparatus according to claim 7, wherein an asymmetrical point spread function is calculated for coma using a blur function obtained by shifting a central position of a radius of a confusion circle in accordance with a distance from a central position of an image.

19. An apparatus according to claim 7, wherein a range $d-\Delta$ from d on a point spread function for a radius (d) of a symmetrical confusion circle is set as a chromatic aberration influence range, and one of red aberration or and blue aberration is applied.

20. An apparatus according to claim 7, wherein one of a blue range and a red range of a color characteristic at not less than a given distance is one of emphasized and decreased.

21. An apparatus according to claim 7, further comprising means for inputting, as a set of units, depth information and image information in units of one of pixels and areas for each object.

22. An apparatus according to claim 7, wherein an input image comprises a set of objects having a predetermined distance in units of sets of objects and not in units of pixels.

* * * * *